US009160064B2

(12) United States Patent
Ferguson

(10) Patent No.: US 9,160,064 B2
(45) Date of Patent: Oct. 13, 2015

(54) SPATIALLY DIVERSE ANTENNAS FOR A HEADSET COMPUTER

(71) Applicant: Kopin Corporation, Taunton, MA (US)

(72) Inventor: David B. Ferguson, Boca Raton, FL (US)

(73) Assignee: Kopin Corporation, Westborough, MA (US)

( * ) Notice: Subject to any disclaimer, the term of this patent is extended or adjusted under 35 U.S.C. 154(b) by 166 days.

(21) Appl. No.: 13/799,769

(22) Filed: Mar. 13, 2013

(65) Prior Publication Data

US 2014/0187179 A1 Jul. 3, 2014

Related U.S. Application Data

(60) Provisional application No. 61/747,191, filed on Dec. 28, 2012.

(51) Int. Cl.
*H01Q 21/24* (2006.01)
*H01Q 1/27* (2006.01)
(Continued)

(52) U.S. Cl.
CPC ............. *H01Q 1/273* (2013.01); *H01Q 3/24* (2013.01); *H01Q 9/42* (2013.01); *H01Q 21/24* (2013.01); *H01Q 25/005* (2013.01); *H04B 1/385* (2013.01); *H04M 1/05* (2013.01)

(58) Field of Classification Search
CPC .................................................. H01Q 21/24
USPC ............................................................ 455/77
See application file for complete search history.

(56) References Cited

U.S. PATENT DOCUMENTS 5,990,793 A 11/1999 Bieback
6,010,216 A 1/2000 Jesiek
(Continued)

FOREIGN PATENT DOCUMENTS

JP 2003-163529 6/2003
WO WO 95/21408 8/1995
(Continued)

OTHER PUBLICATIONS

International Search Report and the Written Opinion dated Dec. 10, 2013 for International Application No. PCT/US2013/065600 filed on Oct. 18, 2013, entitled "Spatially Diverse Antennas for a Headset Computer".
(Continued)

*Primary Examiner* — David Bilodeau
(74) *Attorney, Agent, or Firm* — Hamilton, Brook, Smith & Reynolds, P.C.

(57) ABSTRACT

The invention presented relates to wireless handsfree head worn headset computing devices including a microdisplay device and spatially diverse antenna system. The spatially diverse antenna system provides an effective headset computing device radiation pattern that enables arbitrary user movement and promotes freedom of mobility. Disclosed is a headset computing device including a head worn frame having a profile relatively low in height with respect to a user's head, the user's head creating a RF shadow region along the headset profile by blocking line-of-sight RF propagation paths, the headset includes two or more antennas integrated with the headset frame to sufficiently maintained its low profile. Each antenna has a radiation pattern and are collectively arranged to form an omnidirectional radiation pattern, where at least a first radiation pattern provides coverage in the line-of-sight propagation path while the at least second radiation antenna pattern is in the RF shadow region.

24 Claims, 16 Drawing Sheets

(51) Int. Cl.
*H04M 1/05* (2006.01)
*H01Q 3/24* (2006.01)
*H01Q 9/42* (2006.01)
*H01Q 25/00* (2006.01)
*H04B 1/3827* (2015.01)

(56) References Cited

U.S. PATENT DOCUMENTS

| | | |
|---|---|---|
| 6,108,197 A | 8/2000 | Janik |
| 6,204,974 B1 | 3/2001 | Spitzer |
| 6,325,507 B1 | 12/2001 | Jannard et al. |
| 6,798,391 B2 | 9/2004 | Peterson, III |
| 6,853,293 B2 | 2/2005 | Swartz et al. |
| 6,900,777 B1 | 5/2005 | Hebert et al. |
| 6,922,184 B2 | 7/2005 | Lawrence et al. |
| 6,956,614 B1 | 10/2005 | Quintana et al. |
| 6,966,647 B2 | 11/2005 | Jannard et al. |
| 7,004,582 B2 | 2/2006 | Jannard et al. |
| 7,013,009 B2 | 3/2006 | Warren |
| 7,082,393 B2 | 7/2006 | Lahr |
| 7,147,324 B2 | 12/2006 | Jannard et al. |
| 7,150,526 B2 | 12/2006 | Jannard et al. |
| 7,213,917 B2 | 5/2007 | Jannard et al. |
| 7,216,973 B2 | 5/2007 | Jannard et al. |
| 7,219,994 B2 | 5/2007 | Jannard et al. |
| 7,231,038 B2 | 6/2007 | Warren |
| 7,249,846 B2 | 7/2007 | Grand et al. |
| 7,278,734 B2 | 10/2007 | Jannard et al. |
| 7,331,666 B2 | 2/2008 | Swab et al. |
| 7,445,332 B2 | 11/2008 | Jannard et al. |
| 7,452,073 B2 | 11/2008 | Jannard et al. |
| 7,458,682 B1 | 12/2008 | Lee |
| 7,461,936 B2 | 12/2008 | Jannard |
| 7,494,216 B2 | 2/2009 | Jannard et al. |
| 7,512,414 B2 | 3/2009 | Jannard et al. |
| 7,620,432 B2 | 11/2009 | Willins et al. |
| 7,682,018 B2 | 3/2010 | Jannard |
| 7,740,353 B2 | 6/2010 | Jannard |
| 7,744,213 B2 | 6/2010 | Jannard et al. |
| 7,753,520 B2 | 7/2010 | Fuziak, Jr. |
| 7,760,898 B2 | 7/2010 | Howell et al. |
| 7,798,638 B2 | 9/2010 | Fuziak, Jr. |
| 7,806,525 B2 | 10/2010 | Howell et al. |
| 7,918,556 B2 | 4/2011 | Lewis |
| 7,959,084 B2 | 6/2011 | Wulff |
| 7,966,189 B2 | 6/2011 | Le et al. |
| 7,967,433 B2 | 6/2011 | Jannard et al. |
| 7,969,383 B2 | 6/2011 | Eberl et al. |
| 7,969,657 B2 | 6/2011 | Cakmakci et al. |
| 7,976,480 B2 | 7/2011 | Grajales et al. |
| 7,988,283 B2 | 8/2011 | Jannard |
| 7,997,723 B2 | 8/2011 | Pienimaa et al. |
| 8,010,156 B2 | 8/2011 | Warren |
| 8,020,989 B2 | 9/2011 | Jannard et al. |
| 8,025,398 B2 | 9/2011 | Jannard |
| 8,072,393 B2 | 12/2011 | Riechel |
| 8,092,011 B2 | 1/2012 | Sugihara et al. |
| 8,098,439 B2 | 1/2012 | Amitai et al. |
| 8,123,352 B2 | 2/2012 | Matsumoto et al. |
| 8,140,197 B2 | 3/2012 | Lapidot et al. |
| 8,212,859 B2 | 7/2012 | Tang et al. |
| 8,354,972 B2* | 1/2013 | Borja et al. .................. 343/797 |
| D692,424 S | 10/2013 | Pombo et al. |
| 8,693,970 B2* | 4/2014 | Corman et al. ............ 455/276.1 |
| 2002/0015008 A1 | 2/2002 | Kishida et al. |
| 2002/0077071 A1* | 6/2002 | Williams et al. ............. 455/130 |
| 2002/0094845 A1 | 7/2002 | Inasaka |
| 2003/0068057 A1 | 4/2003 | Miller et al. |
| 2005/0264527 A1 | 12/2005 | Lin |
| 2006/0132382 A1 | 6/2006 | Jannard |
| 2006/0166719 A1 | 7/2006 | Arad et al. |
| 2007/0173300 A1* | 7/2007 | Estrada ...................... 455/575.2 |
| 2008/0102814 A1* | 5/2008 | Chari et al. .................. 455/424 |
| 2008/0198324 A1 | 8/2008 | Fuziak |
| 2009/0128448 A1 | 5/2009 | Riechel |
| 2009/0154719 A1 | 6/2009 | Wulff et al. |
| 2009/0180195 A1 | 7/2009 | Cakmakci et al. |
| 2010/0020229 A1 | 1/2010 | Hershey et al. |
| 2010/0033830 A1 | 2/2010 | Yung |
| 2010/0053069 A1 | 3/2010 | Tricoukes et al. |
| 2010/0121480 A1 | 5/2010 | Stelzer et al. |
| 2010/0171680 A1 | 7/2010 | Lapidot et al. |
| 2010/0238184 A1 | 9/2010 | Janicki |
| 2010/0261440 A1* | 10/2010 | Corman et al. ................. 455/91 |
| 2010/0271587 A1 | 10/2010 | Pavlopoulos |
| 2010/0277563 A1 | 11/2010 | Gupta et al. |
| 2010/0289817 A1 | 11/2010 | Meier et al. |
| 2011/0001699 A1 | 1/2011 | Jacobsen et al. |
| 2011/0089207 A1 | 4/2011 | Tricoukes et al. |
| 2011/0090135 A1 | 4/2011 | Tricoukes et al. |
| 2011/0214082 A1 | 9/2011 | Osterhout et al. |
| 2011/0221669 A1 | 9/2011 | Shams et al. |
| 2011/0221671 A1 | 9/2011 | King, III et al. |
| 2011/0227812 A1 | 9/2011 | Haddick et al. |
| 2011/0227813 A1 | 9/2011 | Haddick et al. |
| 2011/0254698 A1 | 10/2011 | Eberl et al. |
| 2011/0255050 A1 | 10/2011 | Jannard et al. |
| 2011/0273662 A1 | 11/2011 | Hwang et al. |
| 2012/0013843 A1 | 1/2012 | Jannard |
| 2012/0026071 A1 | 2/2012 | Hamdani et al. |
| 2012/0028572 A1* | 2/2012 | Lu et al. ...................... 455/12.1 |
| 2012/0056846 A1 | 3/2012 | Zaliva |
| 2012/0062445 A1 | 3/2012 | Haddick et al. |
| 2012/0105740 A1 | 5/2012 | Jannard et al. |
| 2012/0114131 A1 | 5/2012 | Tricoukes et al. |
| 2012/0169543 A1* | 7/2012 | Sharma et al. ................ 342/458 |
| 2012/0188245 A1 | 7/2012 | Hyatt |
| 2012/0329407 A1* | 12/2012 | Rousu et al. .................. 455/90.2 |
| 2013/0072136 A1* | 3/2013 | Besoli et al. .................. 455/90.2 |
| 2014/0128032 A1* | 5/2014 | Muthukumar ................ 455/411 |

FOREIGN PATENT DOCUMENTS

| | | |
|---|---|---|
| WO | WO 95/23994 | 9/1995 |
| WO | WO 00/79327 | 12/2000 |
| WO | WO 2009/076016 | 6/2009 |
| WO | WO 2011/051660 | 5/2011 |
| WO | WO 2012/040386 | 3/2012 |

OTHER PUBLICATIONS

Zhang, Z., Antenna Design for Mobile Devices, [online], Mar. 31, 2011, [retrieved on Dec. 21, 2012]. Retrieved from the Internet URL: http://books.google.com/books?id=8n3IOzC__FEgC &dq=ifa+antennaA+r....

Inverted F Antenna: IFA [online], Retrieved from the Internet URL:http://books.google.com/books?id=8n31OzC__FEgC &pg=PA146&lpg=PA146&dq=ifa+antenna+radiation+pattern &source=bl&ots=ZVlqkUUWxi &sig=NqXE7iSbEwgiCybiojbYhyalfts&hl=en&sa=X &ei=X9rSUNK1OpSE9gSUroDgCg &ved=0CEYQ6AEwAzgK#v=onepage &q=ifa%20antenna%20radiation%20pattern&f=false.

"Fundamental Parameters of Antennas." In *Radiation Pattern*, pp. 28-29.

Antennas: The Inverted-F Antenna (IFA) [online], [retrieved on Nov. 21, 2012]. Retrieved from the Internet URL: http://www.antenna-theory.com/antennas/aperture/ifa.php.

International Preliminary Report on Patentability dated Jul. 9, 2015 for PCT/US2013/065600, entitled "Spatially Diverse Antennas For A Headset Computer".

* cited by examiner

SPATIALLY DIVERSE ANTENNAS FOR A HEADSET COMPUTER

RELATED APPLICATION

This application claims the benefit of U.S. Provisional Application No. 61/747,191, filed on Dec. 28, 2012. The entire teachings of the above application(s) are incorporated herein by reference.

BACKGROUND OF THE INVENTION

Wireless communication is the transfer of information between two or more points that are not connected by an electrical conductor. Most common wireless communication technologies, such as radio, use electromagnetic waves typically in the radio frequency (RF) ranges. Information, such as sound, video, or other data, is transmitted by systematically modulating at least some property of a RF carrier. Modulation techniques are well known and in general include modulating the amplitude, frequency, or phase of the RF carrier.

Wireless communication is generally achieved through the following process. A source generates a message that when represented in an electrical waveform is referred to as a baseband signal. A transmitter modulates the baseband signal for efficient transmission, which also typically includes amplification. The modulated amplified signal is fed to a transmit antenna. The transmit antenna converts the modulated signal from a signal propagating along a transmission line into a signal propagating through free space. At the destination, a receive antenna converts the signal propagating through free space into a signal propagating on a transmission line. The transmission line feeds a receiver that typically amplifies and demodulates the received signal to recover the baseband signal.

The prominence of wireless data communications technologies, such as Wi-Fi®, WiMAX® and cellular data services, including 3G (W-CDMA, EDGE, CDMA2000®, etc.), and 4G LTE, continues to increase as consumers continue to adopt and rely on mobile computing platforms, such as laptop, smart phone and tablet computing devices. (Wi-Fi is a registered trademark of the Wi-Fi Alliance Corporation of 3925 W. Barker Lane, Austin, Tex. 78759. WiMAX is a registered trademark of the WiMAX Forum Corporation of 12264 El Camino Real, Suite 402, San Diego, Calif. 92130. CDMA2000 is a registered trademark of Telecommunications Industry Association of 2500 Wilson Boulevard, Suite 300, Arlington, Va. 22201).

Antennas are necessary components in wireless communication systems. Generally, antennas are reciprocal devices that are classified by their electrical characteristics. As a reciprocal device, an antenna's electrical characteristics are the same for both transmission and reception. Example antenna characteristics include resonant frequency, bandwidth, gain, radiation pattern, and polarization. Such antenna characteristics are important to antenna designers and play an important part in the operation of a wireless communication system. The vast majority of antennas are based on the half wavelength dipole antenna.

An antenna radiates efficiently at its resonant frequency. Typically, an antenna element also radiates at odd multiples of a quarter wavelength of its fundamental resonant frequency, although not as efficiently as at its fundamental resonant frequency. In general, antenna efficiency and antenna size are directly related.

An antenna has a purely resistive impedance at its fundamental frequency, but most antenna applications require using an antenna over a range of frequencies. The bandwidth of an antenna specifies the range of frequencies over which its performance does not suffer due to poor impedance match. In general, antenna bandwidth and antenna size are directly related.

Gain is a parameter which measures the degree of directivity of an antenna's radiation pattern. More specifically, the antenna gain (sometimes referred to as power gain) is defined as the ratio of the intensity (power per unit surface) radiated by the antenna in the direction of its maximum output, divided by the intensity radiated at the same distance by a hypothetical isotropic antenna. The gain of an antenna is a passive phenomenon; power is not added by the antenna, but simply redistributed to provide more radiated power in a certain direction than would be transmitted by an isotropic antenna.

The radiation pattern of an antenna is a plot of the relative field strength, or gain of the electromagnetic wave emitted by the antenna at different angles. It is typically represented by a three dimensional graph, or polar plots in the three principal planes (e.g., XY, YZ and XZ) or simply in horizontal and vertical planes.

An isotropic radiator is typically defined as "a hypothetical lossless antenna having equal radiation in all directions." The isotropic antenna (or isotropic radiator) is an ideal theoretical antenna. It is considered to be a point in space with no dimensions and no mass. Although the isotropic radiator is a theoretical antenna and does not physically exist, it is often used as a reference for expressing the directive properties of actual antennas. The pattern of an ideal isotropic antenna, which radiates equally in all directions, would look like a sphere.

A directional antenna is one "having the property of radiating or receiving electromagnetic waves more effectively in some directions than in others." The term "directional" is usually applied to an antenna whose maximum directivity is significantly greater than that of a half-wave dipole.

Many antennas, such as monopoles and dipoles, have a directional radiation pattern that is non-directional in one plane (typically the azimuth plane) and directional in an orthogonal plane (typically the elevation plane). Since such antennas emit equal power in all directions in one plane (e.g., the azimuth or horizontal plane), the plot of the radiation pattern in that plane (azimuth) approximates a circle. However, such antennas are directional in the orthogonal plane (e.g., the elevation plane or vertical plane). As a result, a three dimensional plot of the radiation pattern of such an antenna is a torus or donut-shaped. This type of pattern—an essentially nondirectional pattern in one plane (typically, azimuth) and directional pattern in any orthogonal plane (typically, elevation)—is typically designated as "omnidirectional." An omnidirectional pattern is then a special type of directional pattern.

Omnidirectional antennas are only weakly directional antennas and are typically used when the relative position of the other communication station is unknown, arbitrary, or changes often. Also, omnidirectional antennas are typically used at lower frequency where a directional antenna would be too large and too expensive or where a directional antenna is simply not required. One example of an omnidirectional antenna is the vertical antenna or whip antenna, often but not always a quarter wavelength long. A dipole antenna is similar but consists of two quarter wavelength conductors extending in opposite directions, with a total length that is roughly a half a wavelength long at the resonant frequency of the device.

Directional or beam antennas, which radiate more power in a particular direction, are used when additional gain or the directionality of the antenna's beam being known is useful. Directional antennas include parabolic reflectors, horn radiators and Yagi-Uda antennas.

The polarization of an antenna is the orientation of the electric field (E-field) of the electromagnetic wave with respect to the Earth's surface and is determined by the physical structure and orientation of the antenna. For example, a dipole antenna has a linear polarization; when mounted vertically it has a vertical polarization, and when mounted horizontally it has a horizontal polarization. The reflection of electromagnetic waves off of terrestrial objects generally affects polarization.

Polarization is the sum of the orientation of the E-field vector over a period of time projected onto an imaginary plane perpendicular to the direction of travel of the electromagnetic wave. Polarization is in general elliptical, meaning that the polarization of the electromagnetic wave varies in an elliptical direction over time. There are two special cases of elliptical polarization, namely linear polarization—where the ellipse collapses into a line—and circular polarization— where the two axes of the ellipse are equal. Linear polarization is usually created by an antenna forcing the electric field of the emitted electromagnetic wave in a particular orientation. Usually linear polarizations are either vertical polarization or horizontal polarization.

It is important that polarized antennas be matched so that the maximum amount of power can be transferred between the transmitter and receiver. Therefore, vertically polarized transmit antennas should be matched with vertically polarized receiving antennas and horizontally polarized transmit antenna should be matched with horizontally polarized receiving antennas.

SUMMARY OF THE INVENTION

Presented herein are example embodiments of a headset computing device, and corresponding methods for transceiving using such a headset computing device, including a head worn frame having a profile relatively low in height with respect to a user's head, the user's head creating a radiofrequency (RF) shadow region along the headset profile by blocking line-of-sight RF propagation paths, the headset including two or more antennas integrated with the headset frame to sufficiently maintained its low profile. Each antenna has a radiation pattern and collectively the antennas are arranged to form a combined radiation pattern that approaches an omnidirectional pattern (approximately omnidirectional, or a pattern of overlapping spheres), where at least a first radiation pattern provides coverage in the line-of-sight propagation path while the at least second radiation antenna pattern is in the RF shadow region.

The collective radiation pattern can approach omnidirectional in at least two orthogonal principal planes. The radiation pattern can further be dual linearly polarized. The dual linear polarization can include vertical and horizontal polarizations. The at least two antennas can be integrated with the headset frame to have approximately 180° of spatial diversity between the antennas with respect to the user's head.

The headset computing device can further include a splitter/combiner coupled to the two or more antennas for combining RF signals received by the antennas and for splitting transmit RF signals to feed the antennas for transmission. The splitter/combiner coupled to the two or more antennas can be further coupled to a RF transceiver (or transmitter and receiver) for receiving and/or transmitting RF signals.

The headset computing device can further include RF switch coupled to the two or more antennas for switching between the antennas. Such switching reduces RF losses, and thus provides a more robust communications link, compared to using a splitter/combiner. The RF switch coupled to the two or more antennas can be further coupled to the RF transceiver (or transmitter and receiver) for receiving and/or transmitting RF signals through the at least one switched on antenna.

The two or more antennas can be tuned to operate over multiple frequency bands, the frequency bands being separate and non-overlapping. The multiple frequency bands can include a first frequency band ranging approximately from 2.36 GHz 2.54 to GHz and a second frequency band ranging from roughly 4.28 GHz to 5.16 GHz. The headset computing device can further include a diplexer (or multiplexer) coupled to the two or more antennas tuned to operated over the multiple frequency bands for diplexing (or multiplexing, i.e., combining/separating) the multiple frequency bands.

The two or more antennas can be monopole, dipole, inverted F, planar inverted F, dual band inverted F, dual linearly polarized, or circularly polarized type antennas, or any combination thereof.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The present application relates to wireless communications and more particularly to a wireless computing headset with one or more micro-display devices and spatially diverse antennas.

Mobile computing devices, such as notebook PC's, smart phones, and tablet computing devices, are now common tools used for producing, analyzing, communicating, and consuming data in both business and personal life. Consumers continue to embrace a mobile digital lifestyle as the ease of access to digital information increases with high-speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high-resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display. As a result, consumers are now seeking a hands-free high-quality, portable, color display solution to augment or replace their hands-dependent mobile devices.

Recently developed micro-displays can provide large-format, high-resolution color pictures and streaming video in a very small form factor. One application for such displays can be integrated into a wireless headset computer worn on the head of the user with a display within the field of view of the user, similar in format to either eyeglasses, audio headset or video eyewear. A "wireless computing headset" device includes one or more small high-resolution micro-displays and optics to magnify the image. The WVGA microdisplay's can provide super video graphics array (SVGA) (800×600) resolution or extended graphic arrays (XGA) (1024×768) or even higher resolutions. A wireless computing headset contains one or more wireless computing and communication interfaces, enabling data and streaming video capability, and provides greater convenience and mobility through hands dependent devices.

For more information concerning such devices, see co-pending U.S. application Ser. No. 12/348,646 entitled "Mobile Wireless Display Software Platform for Controlling Other Systems and Devices," by Parkinson et al., filed Jan. 5, 2009, PCT International Application No. PCT/US09/38601 entitled "Handheld Wireless Display Devices Having High Resolution Display Suitable For Use as a Mobile Internet Device," by Jacobsen et al., filed Mar. 27, 2009, and U.S. Application No. 61/638,419 entitled "Improved Headset Computer," by Jacobsen et al., filed Apr. 25, 2012, each of which are incorporated herein by reference in their entirety.

Figure 1:
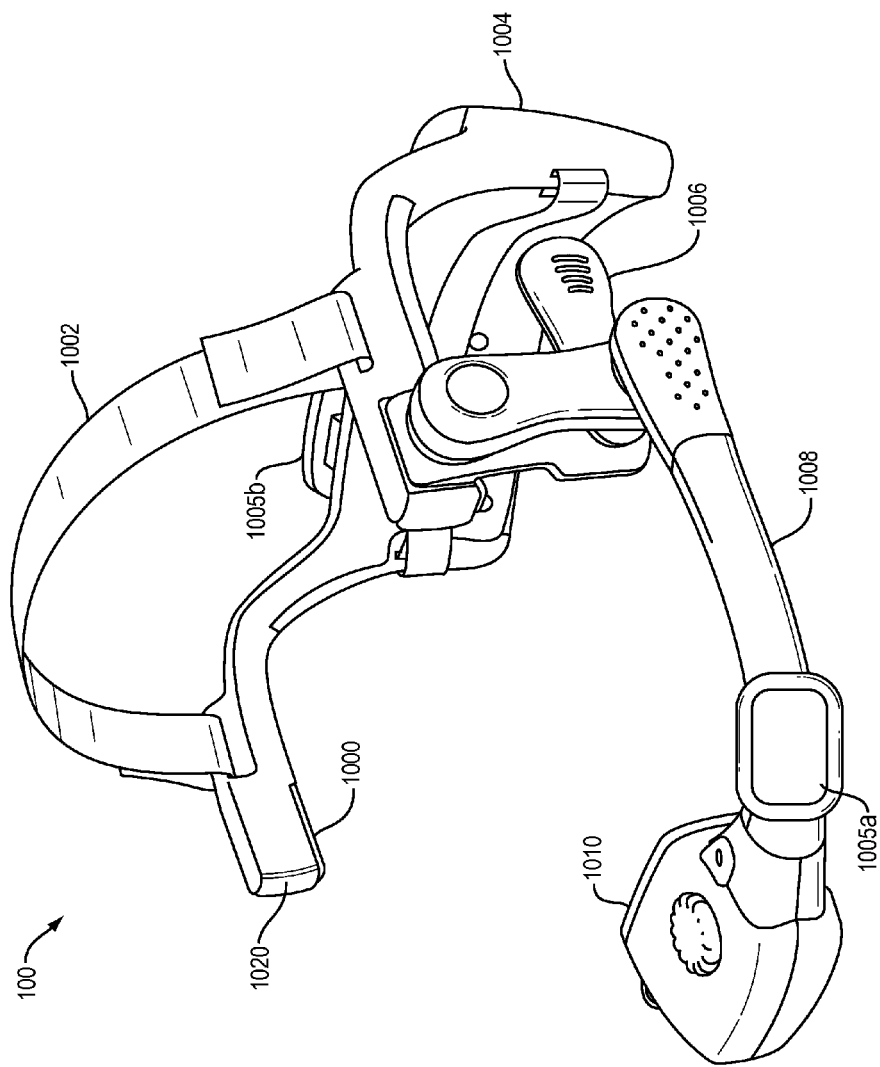
FIG. 1 is a headset computing device having a low profile and spatially diverse antennas integrated into the low-profile.

FIG. 1 shows an example embodiment of a wireless computing headset device 100 (also referred to herein as a headset computer (HC)) that incorporates a high-resolution (VGA or better) microdisplay element 1010, spatially diverse antennas 1005a,b and other features described below. HC 100 can include audio input and/or output devices, including one or more microphones, input and output speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports (not shown in detail in FIG. 1). Typically located within the housing of headset computing device 100 are various electronic circuits including, a microcomputer (single or multicore processors), one or more wired and/or wireless communications interfaces, memory or storage devices, various sensors and a peripheral mount or mounts, such as a "hot shoe."

Example embodiments of the HC 100 can receive user input through sensing voice commands, head movements, and hand gestures, or any combination thereof. Microphone(s) operatively coupled or preferably integrated into the HC 100 can be used to capture speech commands which are then digitized and processed using automatic speech recognition techniques. Gyroscopes, accelerometers, and other micro-electromechanical system sensors can be integrated into the HC 100 and used to track the user's head movement to provide user input commands. Cameras or other motion tracking sensors can be used to monitor a user's hand gestures for user input commands. Such a user interface overcomes the hands-dependant formats of other mobile devices.

The headset computing device 100 can be used in various ways. It can be used as a remote display for streaming video signals received from a remote host computing device (not shown in FIG. 1). The host may be, for example, a notebook PC, smart phone, tablet device, or other computing device having less or greater computational complexity than the wireless computing headset device 100, such as cloud-based network resources. The host may be further connected to other networks, such as the Internet. The headset computing device 100 and host can wirelessly communicate via one or more wireless protocols, such as Bluetooth®, Wi-Fi, WiMAX, 4G LTE or other wireless radio link. (Bluetooth is a registered trademark of Bluetooth Sig, Inc. of 5209 Lake Washington Boulevard, Kirkland, Wash. 98033.) In an example embodiment, the host may be further connected to other networks, such as through a wireless connection to the Internet or other cloud-based network resources, so that the host can act as a wireless relay. Alternatively, some example embodiments of the HC 100 can wirelessly connect to the Internet and cloud-based network resources without the use of a host wireless relay.

FIG. 1 is a perspective view showing some details of an example embodiment of a headset computer 100. The example embodiment HC 100 generally includes, a frame 1000, strap 1002, rear housing 1004, speaker 1006, cantilever, or alternatively referred to as an arm or boom 1008, micro-display subassembly 1010 and integrated antennas 1005a and 1005b.

A head worn frame 1000 and strap 1002 are generally configured so that a user can wear the headset computer device 100 on the user's head. A housing 1004 is generally a low profile unit which houses the electronics, such as the microprocessor memory or other storage device, along with other associated circuitry. Speakers 1006 provide audio output to the user so that the user can hear information. Micro-display subassembly 1010 is used to communicate visual information to the user. It is coupled to the arm 1008. The arm 1008 generally provides physical support such that the micro-display subassembly is able to be positioned within the user's field of view, preferably in front of the eye of the user or within its peripheral vision preferably slightly below or above the eye. Arm 1008 also provides the electrical or optical connections between the microdisplay subassembly 1010 and the control circuitry housed within housing unit 1004. Two or more antennas 1005a and 1005b are located at spatially diverse locations operatively coupled and/or integrated into the headset computing device such that the low profile of the device is maintained (e.g., no part of the HC 100 rises above the crown of the head of the user). One antenna 1005a is integrated proximate to microdisplay subassembly 1010 and arm 1011. A second antenna 1005b is located approximately 180° away from antenna 1005a, opposed to antenna 1005a, (e.g., on the opposite side of a user's head while wearing the headset computing device 100). Although the antenna 1005a of FIG. 1 is positioned at the front of HC 100 and antenna 1005b is positioned towards the rear of HC 100, it should be recognized that such an arrangement, while preferable, is not the only arrangement that will provide for spatial diversity. The two antennas can be preferably placed approximately 180° apart on any part (frame 1000, strap 1002, housing 1004, arm 1008) of the HC 100, such as on opposite sides of the strap 1002. Further, the low profile HC 100 is wearable with helmets and ball caps and the like. Such uses of HC 100 cause problems for traditional antenna outfitting. The antenna placement and configurations of the present invention account for such uses of HC 100.

As is known to those of skill in the art, the term "antenna" may be used to refer to an individual antenna or a system of antennas, both of which may also include a transmission line feed network (tuning network) and other front-end components located before a receiver, transmitter, or transceiver.

Figure 2A:
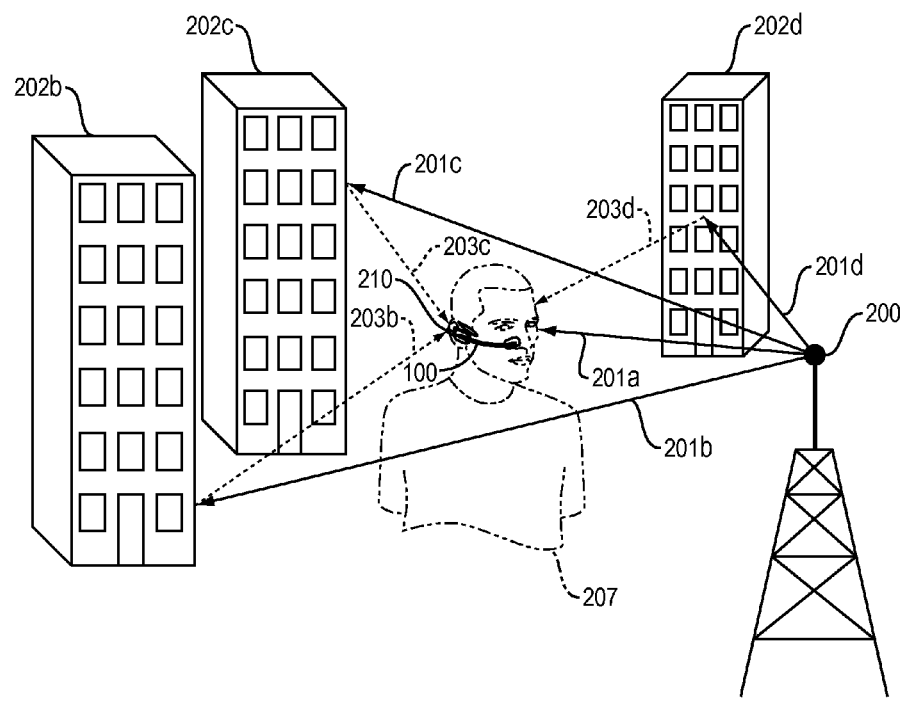
FIG. 2A is a rich multipath environment that includes line-of-sight propagation paths and reflection paths in which the headset computing device can be used.
Figure 2B:
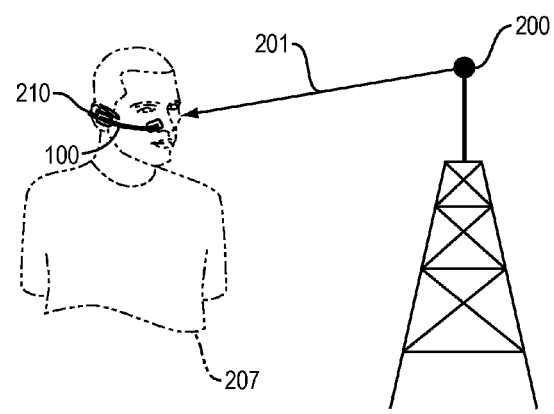
FIG. 2B is an environment that includes only line-of-sight propagation in which the headset computing device can be used.

FIGS. 2A and 2B illustrate environments in which an embodiment of the headset computing device 100 may be used. In FIG. 2A illustrates a rich multipath propagation environment in which user 207 is wearing headset computing device 100. Multipath is the propagation phenomenon that results when RF signals reflect off of objects in the environment and reach the receiving antenna via two or more propagation paths. The effects of multipath include interference (both constructive and destructive), and phase shifting of the received signal. Host 200, which can be for example a Wi-Fi router, cellular tower, or some other RF source, broadcasts RF signals along line-of-sight propagation paths 201*a-d*. Because of the terrestrial objects in the environment of FIG. 2A, such as buildings 202*b-d*, the RF signal propagating along line-of-sight propagating signals 201 respectively bounce off of terrestrial objects, also called reflecting objects, 202*b-d* creating reflected multipath or RF signal propagating paths 203*b-d*.

Although FIG. 2A shows an urban multipath environment, the headset device 100 may be used in other multipath rich environments, for example, an office and/or a warehouse. In the case where HC 100 is equipped with only one integrated antenna (not shown) the head of user 207 can block the direct line-of-sight RF propagation path 201*a* and create a RF shadow region 210 along the profile of HC 100 relative to RF source host 200. In such an arrangement the antenna of HC 100 is in the RF shadow region 210, and provides limited RF coverage due to the antenna being blocked and the unblocked portion of the HC 100 being in a direction that does not include a direct line-of-sight propagation path to the RF source host 200. In such a situation any signals received by the integrated antenna travels along multipath paths 203*b-c*.

In an environment without multipath phenomenon, such that illustrated in FIG. 2B, the RF shadow region 210 caused by the user 207 on headset device 100 blocks the line-of-sight RF propagation path 201 from RF source host 200; the HC 100 does not receive the signal propagated by a host 200. The headset computing device 100 may also be used in open environments (e.g., environments free from terrestrial objects acting as RF reflectors) that do not include multipath propagation characteristics, such as, rural areas with flat open fields. One useful aspect of the spatially diverse antenna system, particularly a spatially diverse dual antenna system having 180° diversity, is that such an antenna system significantly improves performance over a single monopole or dipole antenna by reducing the effect of RF shadowing (blockage).

Figure 3A:
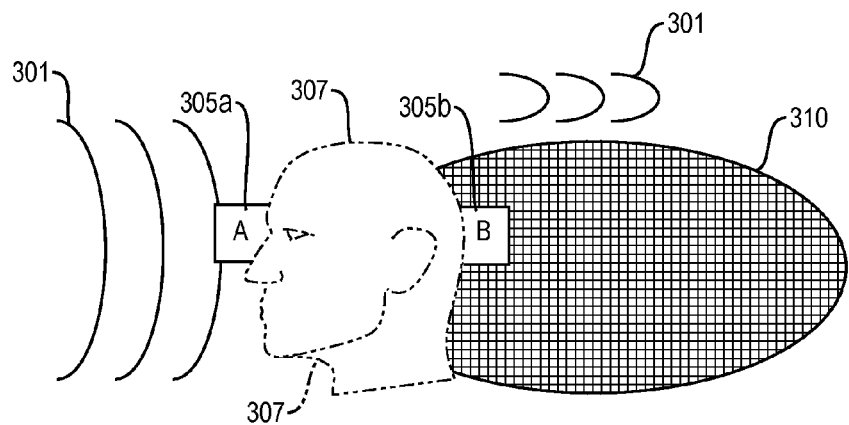
FIG. 3A is a side view of RF blockage caused by a user's head while wearing the headset computer device.
Figure 3B:
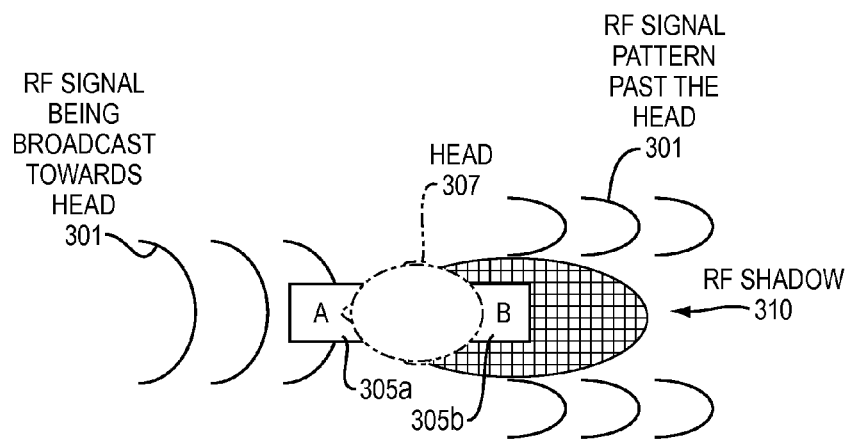
FIG. 3B is a topside view of RF blockage caused by the user's head while wearing the headset computing device.

FIGS. 3A and 3B illustrate the RF shadowing phenomenon and the positioning of spatially diverse antennas to compensate for the RF blockage. In FIG. 3A signals propagating along line-of-sight RF propagating path 301 arrived at a user's head 307. The user is wearing the head worn headset computer 100 (not shown) that includes integrated low-profile antennas 305*a* and 305*b*. The user's head 307 creates RF shadow (or RF blockage) region 310 along the profile of the HC 100. If an antenna 305*b* is located within the blockage region 310 it will not receive signals propagating along the direct line-of-sight propagation path 301.

The performance of the wireless data link can be greatly improved by adding at least one spatially diverse antenna 305*a* to the HC 100. The addition of multiple antennas, preferably at some degree of opposing positioning to each other along the HC 100, improves the effective (or perceived) radiation pattern of the HC 100 antenna system by combining the individual antenna radiation patterns jointly so that the effective combined radiation pattern more closely resembles a pattern approaching an omnidirectional pattern (approximately omnidirectional, such as two overlapping spheres) in at least one of the principal planes (e.g., XY, YZ, or XZ). For example, if spatially diverse antennas 305*a,b* are each a single vertically polarized planar inverted F antenna, then the combined pattern of the HC antenna system approximates an omnidirectional pattern in the azimuth (or horizontal) plane.

With spatially diverse antennas 305*a* and 305*b* located along opposing sides of the HC 100, and therefore, the head of user 307, at least one of the radiation patterns of the spatially diverse antennas 305*a,b* will provide coverage coinciding with the direct line-of-sight propagation path 301 of RF signals transmitted by host 200, enabling reception by the HC 100.

FIG. 3B shows a topside view of the RF blocking phenomenon of FIG. 3A. Signals propagating along line-of-sight propagation path 301 arrive at the headset computer 100 (not shown). Integrated low-profile antenna 305*a* has a radiation pattern which provides coverage that is coincidental with the line-of-sight RF propagation path 301. Integrated antenna 305*b* has a radiation pattern that is located within the RF shadow (RF blockage) region 310. As such, signals propagating along the line-of-sight propagation path 301 are received exclusively by antenna 305*a* and not antenna 305*b*.

Figure 4A:
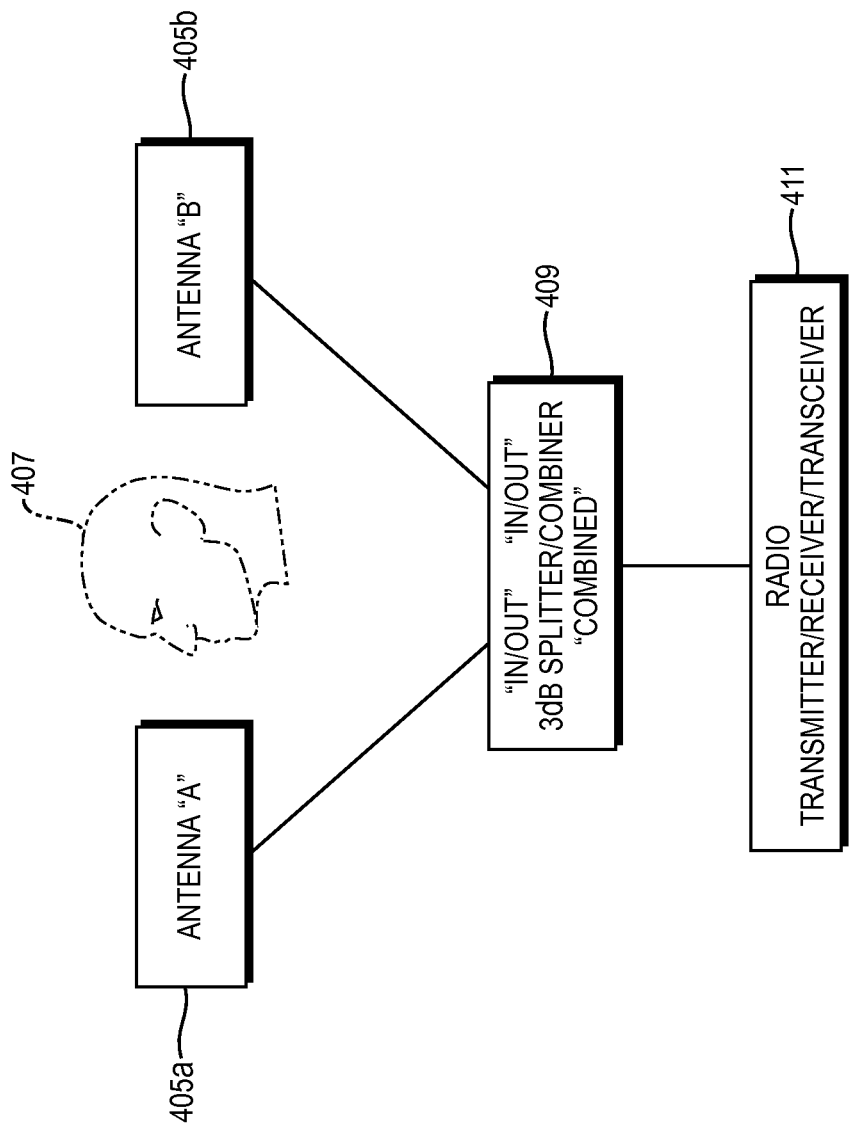
FIG. 4A-4F are schematic diagrams of example embodiments of the spatially diverse antenna system.

FIG. 4A shows a schematic diagram of an example embodiment of a spatially diverse antenna system. A first antenna 405*a* and second antenna 405*b* are integrated into the low-profile headset computing device 100 (not shown) and arranged such that they are on approximately opposite sides of the head of the user 407 and can each provide about a 180° field-of-view for the radiation pattern coverage (i.e., hemispherical line-of-sight coverage), without suffering RF blockage, in at least one plane. When combined together the first and second antennas can provide a 360° field-of-view for the coverage in at least one plane. For example, using a planar vertically polarized inverted F-type antenna for each of the first and second spatially diverse antennas can jointly provide 360° of azimuth coverage (i.e., a combined pattern approaching that of an omnidirectional pattern in the horizontal plane, such as that produced by two overlapping spherical patterns).

In FIG. 4A, first antenna 405*a* and second antenna 405*b* are operatively coupled to a splitter/combiner 409, preferably a 3 dB splitter/combiner so that signals from/to the first and second antennas are combined/divided equally. When receiving, the signals are combined such that they are added together at splitter/combiner 409. The splitter/combiner 409 is further operatively connected to radio transceiver 411. Those having skill in the art will recognize that radio transceiver 411 can be replaced with a receiver and/or transmitter, without departing from the scope of the invention. The first and second antennas 405*a,b* are typically operatively coupled to the splitter/combiner 409 using a transmission line, such as coaxial cable, microstrip, or stripline or some combination thereof. The splitter/combiner 409 is typically operatively coupled to radio transceiver 411 using a similar type of transition line.

Those having skill in the art will recognize further that the multiple antennas, such as the first and second antennas 405*a,b*, can be operatively coupled using passive coupling devices other than a 3 dB splitter/combiner, or other diversity techniques, such as switching—where the signal from only one antenna is fed to the receiver for as long as the quality of that signal remains above some prescribed threshold (measured using an RF diode detector or the like) and switched (using an RF switch) to another antenna—or selecting—which is similar to switching, however, the best signal-to-noise ratio (SNR) among the received signals is utilized.

Furthermore, because the headset computing device 100 is worn, the physical orientation of the HC 100 depends on the activity of the user, and therefore, is arbitrary. For example, a user 407 may lie down to the work underneath the body of a vehicle, or perform evasive maneuvers in a military setting. As a result, if the first and second antennas 405*a,b* are vertically polarized, they may not remain aligned with the polarization (typically vertical) of the RF host 200 (not shown) when the user's head changes orientation. In such instances even if the effective combined antenna pattern of the HC 100 provides coverage that coincides with the line-of-sight propagation path (201, 301) of an RF source host (200), the communications link of the HC 100 may be broken due to polarization mismatch.

In order to alleviate polarization mismatch loss, additional antenna elements, such as co-located orthogonally arranged antennas, can be used to provide an orthogonally polarized radiation pattern (e.g., a horizontally polarized pattern). The radiation patterns of such orthogonally arranged antenna elements (or antennas) can be combined using techniques described above, such as by using a splitter/combiner, to form a dual linearly polarized combined antenna pattern. Such a dual linearly polarized radiation pattern can minimize polarization loss due to the head misalignment of a user 407 with a linearly polarized source because the dot product (or scalar projection) of the linearly polarized source with the effective dual polarization radiation pattern always results in full polarization alignment (i.e., no polarization mismatch loss).

Such orthogonal antenna elements (or antennas) can be co-located with each of the spatially diverse antennas 405*a,b* integrated with HC 100. In other words, an orthogonal antenna can be co-located on the front side of the head of user 407 at a first antenna 405*a*, and combined using a splitter/combiner such that the combined radiation pattern is vertically and horizontally polarized. Similarly, an orthogonal antenna can be co-located on the rear side of the head of user 407 at a second antenna 405*b*, and combined using a splitter/combiner such that the combined radiation pattern is vertically and horizontally polarized.

In an example embodiment of a spatially diverse antenna system for a HC 100, a first pair of co-located orthogonally arranged antennas can be located with approximately 180° spatial diversity with respect to a second pair of co-located orthogonally arranged antennas such that a dual linearly polarized (vertical and horizontal) radiation pattern is provided, which enables a user of the HC 100 to move in any direction and maintain a communications link with a host 200.

One useful aspect of the spatially diverse dual antenna system, particularly a spatially diverse dual antenna system design with antennas having 180° diversity, is that it significantly improves performance over a single monopole or dipole antenna systems.

The performance of a spatially diverse dual antenna system can be further enhanced by using an antenna or antennas that that offer additional main lobe(s) having polarization in orthogonal planes, for example one polarization can be vertical and the orthogonal polarization can be horizontal, thus enabling reception and transmission for vertical and horizontal polarizations. Ideally, both the vertical and horizontal polarization main lobe radiation patterns have equal gain and are isotropic or spherical in shape. However, as such an isotropic radiator is only a theoretical ideal, such performance can only be approximated. Using antennas with approximately omnidirectional patterns, such as monopole, dipole, inverted F, planar inverted F, or circularly polarized antennas, of a combination thereof, with a splitter/combiner can approximate the ideal radiation pattern performance and provide equal gain for horizontal and vertical polarizations, where the later antenna type more closely approximates the ideal pattern than the former.

Another way to achieve the desired useful performance for vertical and horizontal polarizations is to use a controlled switch that toggles between a vertically polarized antenna and a horizontally polarized antenna, both co-located in the front of a HC 100 and both antennas having equivalent antenna performance specifications. Those of skill in the art will recognized that the same arrangement can be provided simultaneously in the rear for maximum instantaneous system gain. The front and the rear orthogonal antenna pairs can be summed passively for ease of implementation; or a more complex diversity switching method could be employed. Using inverted F antennas, the estimated difference in performance between the two polarizations on average can be 10 dB to 15 dB. In other words, the estimated polarization isolation or polarization mismatch loss can be 10 dB to 15 dB. Using monopole or dipole antennas, the difference could be as high as 30 dB.

Additionally, using antennas that can operate at two or more tuned frequencies can provide beneficial space savings for headsets configured to use multiple frequency bands. Such antennas, for example dual band inverted F antennas, having two or more bands of operation, save valuable device real estate by negating the need for dedicated antennas to operate at each band.

As presented, an embodiment of the spatially diverse antenna system for a HC reduces the RF shadow caused by a user's head and improves operation with respect to operating in either vertical or horizontal polarized environments. A spatially diverse antenna system can be installed on a helmet of a tactical personnel, such that of a SWAT member, firefighter, or soldier.

Figure 4B:
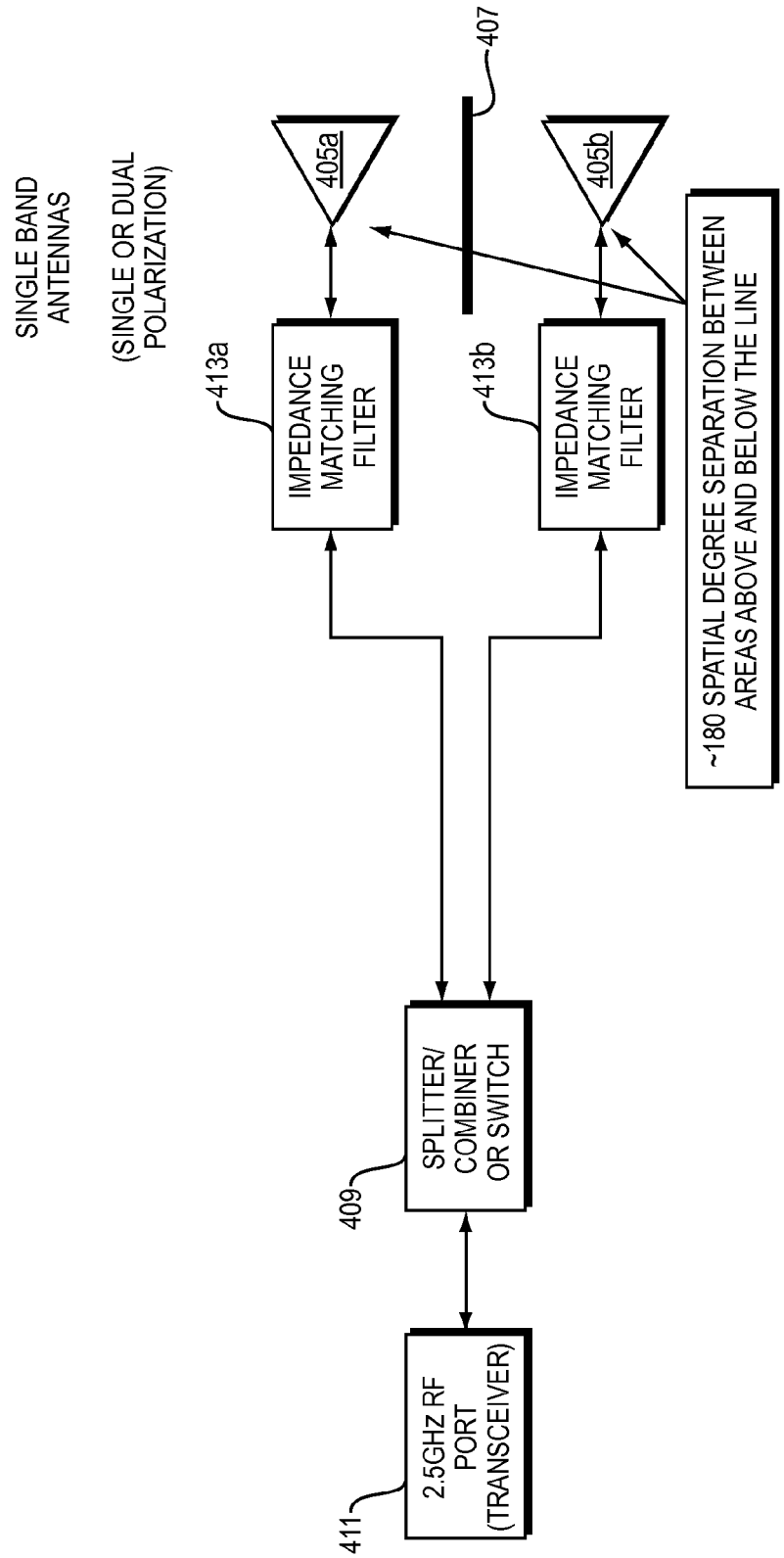

FIG. 4B shows a schematic diagram of another example embodiment of a spatially diverse antenna system. A first antenna 405*a* and second antenna 405*b* are integrated into the low-profile headset computing device 100 (not shown) and arranged so that they are on approximately opposite sides of the head of the user 407 and can each provide about a 180° field-of-view for the radiation pattern coverage (i.e., hemispherical line-of-sight coverage), without suffering RF blockage, in at least one plane. When combined together the first and second antennas can provide a 360° field-of-view for the coverage in at least one plane.

In FIG. 4B, the first antenna 405*a* and the second antenna 405*b* are each respectively coupled to an impedance matching filter 413*a,b*, so that RF power can be efficiently radiated or received by reducing the impedance mismatch between the transmission line and free-space. The impedance matching filters 413*a,b* are coupled to a splitter/combiner or switch 409 via transmission line. The splitter/combiner or switch 409 is further operatively connected to radio transceiver 411. In the case when splitter/combiner or switch 409 is a splitter/combiner and the system is receiving, the signals are combined such that they are added together at splitter/combiner 409. In the case when splitter/combiner or switch 409 is a switch and the system is receiving, the signals from the "on" antenna are coupled to the transceiver 411. In the case when splitter/combiner or switch 409 is a splitter/combiner and the system is transmitting, the signals are split such that they are divided together at splitter/combiner 409. In the case when splitter/combiner or switch 409 is a switch and the system is transmitting, the signals are couple to the "on" antenna for transmission.

Figure 4C:
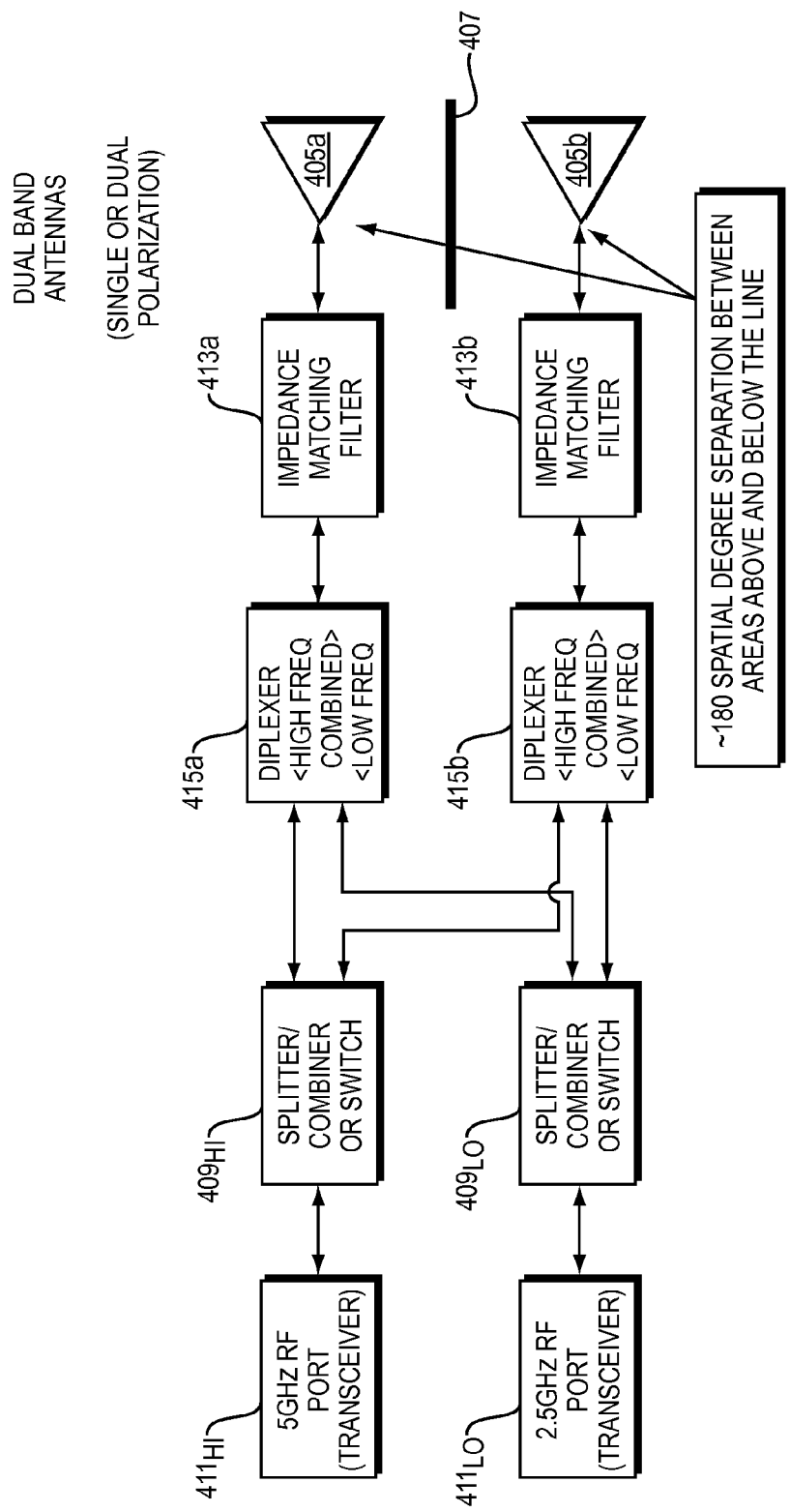

FIG. 4C shows a schematic diagram of a further example embodiment of a spatially diverse antenna system. A first dual band antenna 405a and second dual band antenna 405b are integrated into the low-profile headset computing device 100 (not shown) and arranged so that they are on approximately opposite sides of the head of the user 407 and can each provide about a 180° field-of-view for the radiation pattern coverage (i.e., hemi-spherical line-of-sight coverage), without suffering RF blockage, in at least one plane. When combined together the first and second dual band antennas can provide a 360° field-of-view for the coverage in at least one plane.

In FIG. 4C the dual band antennas 405a,b are coupled to an impedance matching filter 413a,b. The impedance matching filters 413a,b are each coupled to a diplexer 415a,b. Each diplexer 415a,b is coupled to a high frequency band transceiver $411_{Hi}$ and a low frequency band transceiver $411_{Lo}$ through a splitter/combiner or switch 409. In the embodiment of the spatially diverse antenna system presented in FIG. 4C, the diplexers 415a,b diplex the signals received from the dual band antennas so that the low band signals received are filtered and coupled to the low band transceiver and the high band signals received are filtered and coupled to the high band transceiver. For transmission, signals from both the high and low band transceivers are diplexed and coupled to the dual band antennas 405a,b, through the impedance matching filters 413a,b. If FIG. 4C is implemented using switches 409, rather than splitter/combiners 409, then the high and/or low transceiver reception/transmission can be switched on or off using the switches 409.

Figure 4D:
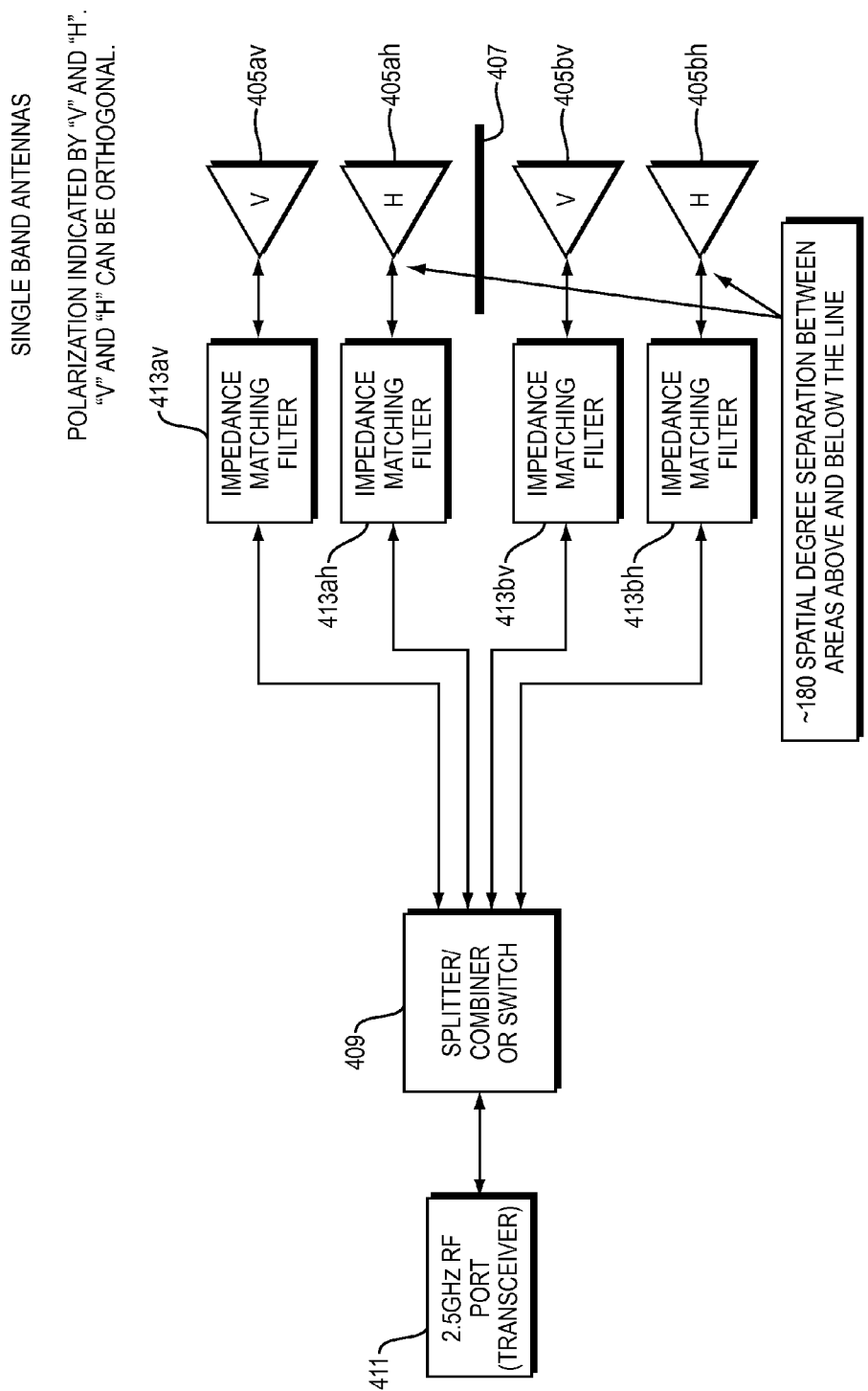

FIG. 4D shows a schematic diagram of a further still example embodiment of a spatially diverse antenna system. A first vertically polarized antenna 405av, a first horizontally polarized antenna 405ah, a second vertically polarized antenna 405bv, and second horizontally polarized antenna 405b are integrated into the low-profile headset computing device 100 (not shown) and arranged so that the first vertically polarized antenna 405av and first horizontally polarized antenna 405ah are approximately co-located and the second vertically polarized antenna 405bv and second horizontally polarized antenna 405bh are approximately co-located and are on approximately an opposite side of the head of the user 407 from the first vertically and horizontally polarized antennas 405av,ah. Each of the antennas 405av,ah,bv,bh provide about a 180° field-of-view for the radiation pattern coverage (i.e., hemi-spherical line-of-sight coverage), without suffering RF blockage, in at least one plane. The pairs of co-located antennas, namely, antenna 405av,ah and 405bv,bh, each provide approximately the same 180° field-of-view for the radiation pattern coverage as the other co-located antenna of the pair. When combined together the antennas can provide a 360° field-of-view for the coverage in at least one plane but more typically at least two planes.

In FIG. 4D, the first vertically polarized antenna 405av, first horizontally polarized antenna 405ah, second vertically polarized antenna 405bv, and second horizontally polarized antenna 405bh are each respectively coupled to an impedance matching filter 413av,ah,bv,bh, so that RF power can be efficiently radiated or received by reducing the impedance mismatch between the transmission line and free-space. The impedance matching filters 413av,ah,bv,bh are coupled to a splitter/combiner or switch 409 via transmission line. The splitter/combiner or switch 409 is further operatively connected to radio transceiver 411. In the case when splitter/combiner or switch 409 is a splitter/combiner and the system is receiving, the signals are combined such that they are added together at splitter/combiner 409. In the case when splitter/combiner or switch 409 is a switch and the system is receiving, the signals from the "on" antenna are coupled to the transceiver 411. In the case when splitter/combiner or switch 409 is a splitter/combiner and the system is transmitting, the signals are split such that they are divided together at splitter/combiner 409. In the case when splitter/combiner or switch 409 is a switch and the system is transmitting, the signals are couple to the "on" antenna for transmission. In the case when splitter/combiner or switch 409 is a switch, a single antenna can be turned "on." The determination of which antenna to turn "on" can depended on many factors, including which antenna has received the strongest signal.

Figure 4E:
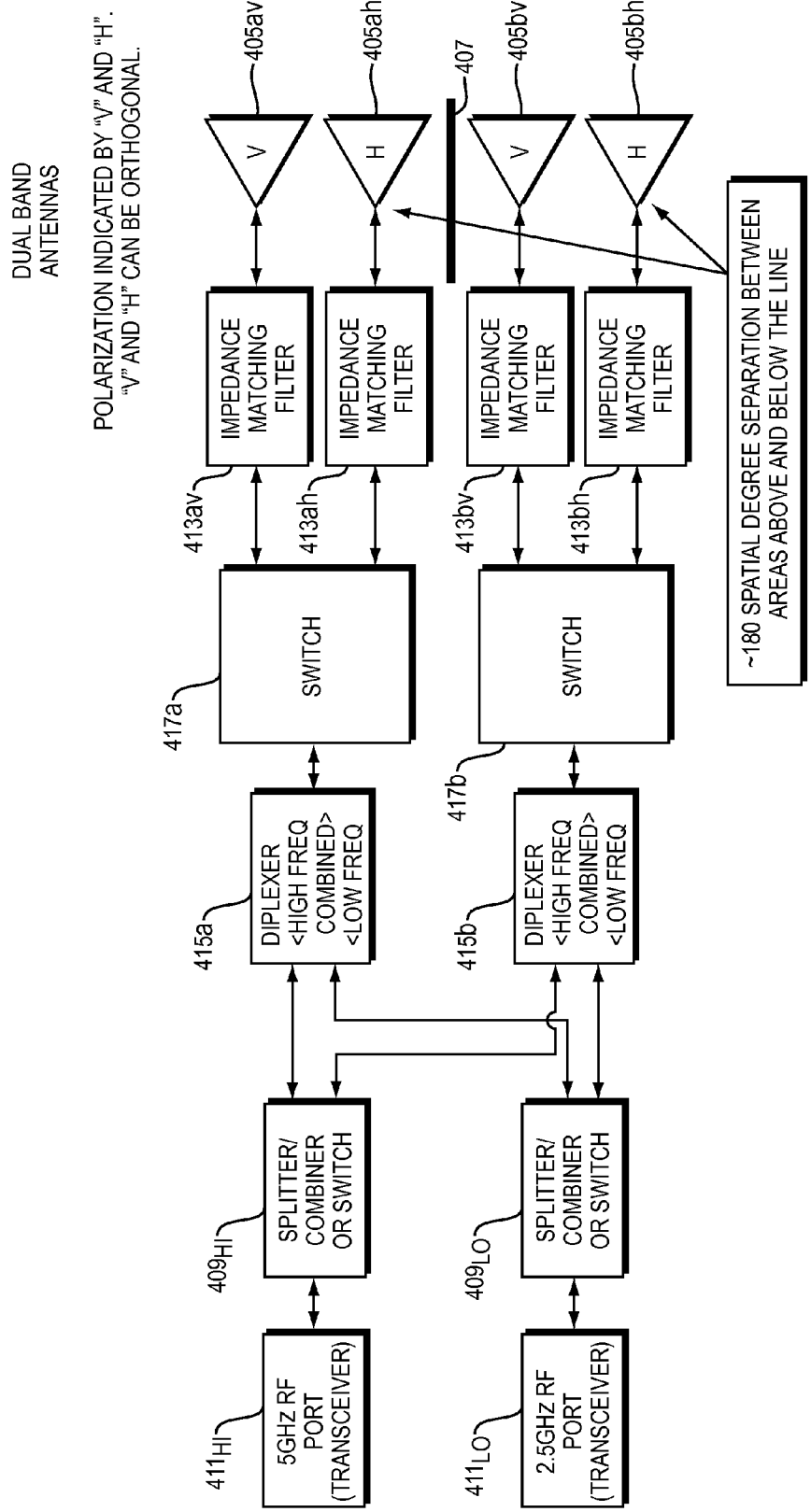

FIG. 4E shows a schematic diagram of yet another example embodiment of a spatially diverse antenna system. A first vertically polarized dual band antenna 405av, a first horizontally polarized dual band antenna 405ah, a second vertically polarized dual band antenna 405bv, and second horizontally polarized dual band antenna 405bh are integrated into the low-profile headset computing device 100 (not shown) and arranged such that the first vertically polarized dual band antenna 405av and first horizontally polarized dual band antenna 405ah are approximately co-located and the second vertically polarized dual band antenna 405bv and second horizontally polarized dual band antenna 405bh are approximately co-located and are on approximately an opposite side of the head of the user 407 from the first vertically and horizontally polarized antennas 405av,ah. Each of the dual band antennas 405av,ah,bv,bh provide about a 180° field-of-view for the radiation pattern coverage (i.e., hemi-spherical line-of-sight coverage), without suffering RF blockage, in at least one plane. The pairs of co-located dual band antennas, namely, dual band antennas 405av,ah and 405bv,bh, each provide approximately the same 180° field-of-view for the radiation pattern coverage as the other co-located antenna of the pair. When combined together the antennas can provide a 360° field-of-view for the coverage in at least one plane but more typically at least two planes.

In FIG. 4E the dual band antennas 405av,ah,bv,bh are each coupled to an impedance matching filter 413av,ah,bv,bh. The impedance matching filters 413av,ah,bv,bh are each coupled to a switch 417a,b. Each switch 417a,b is couple to a diplexer 415a,b. Each diplexer 415a,b is coupled to a high frequency band transceiver $411_{Hi}$ and a low frequency band transceiver $411_{Lo}$ through a splitter/combiner or switch $409_{Hi, Lo}$. In the embodiment of the spatially diverse antenna system presented in FIG. 4E, the diplexers 415a,b diplex the signals received from the dual band antennas so that the low band signals received are filtered and coupled to the low band transceiver and the high band signals received are filtered and coupled to the high band transceiver. For transmission, signals from both the high and low band transceivers are diplexed and coupled to the dual band antennas 405av,ah,bv,bh, through the switches 417a,b and through impedance matching filters 413av,ah,bv,bh. The switches 417a,b couple directly to the impedance matching filters 413av,ah,bv,bh can be used to control which radiation polarization pattern is used, that is either vertical or horizontal polarization. If FIG.

4E is implemented using switches $409_{Hi, Lo}$, rather than splitter/combiners $409_{Hi, Lo}$, then the high and/or low transceiver reception/transmission can be switched on or off using the switches $409_{Hi, Lo}$.

Figure 4F:
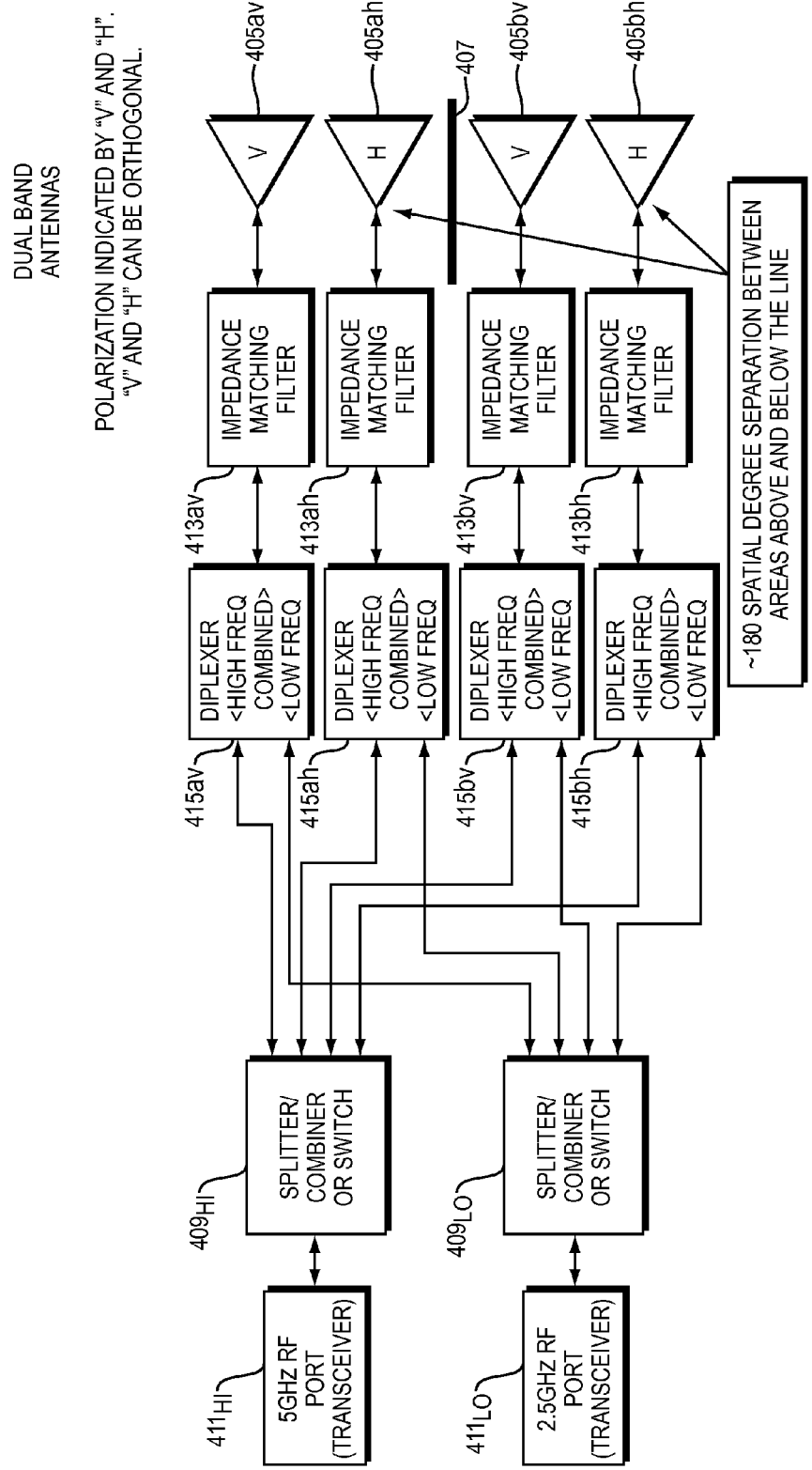

FIG. 4F shows a schematic diagram of a still further example embodiment of a spatially diverse antenna system. A first vertically polarized dual band antenna 405av, a first horizontally polarized dual band antenna 405ah, a second vertically polarized dual band antenna 405bv, and second horizontally polarized dual band antenna 405bh are integrated into the low-profile headset computing device 100 (not shown) and arranged so that the first vertically polarized dual band antenna 405av and first horizontally polarized dual band antenna 405ah are approximately co-located and the second vertically polarized dual band antenna 405bv and second horizontally polarized dual band antenna 405bh are approximately co-located and are on approximately an opposite side of the head of the user 407 from the first vertically and horizontally polarized antennas 405av,ah. Each of the dual band antennas 405av,ah,bv,bh provide about a 180° field-of-view for the radiation pattern coverage (i.e., hemi-spherical line-of-sight coverage), without suffering RF blockage, in at least one plane. The pairs of co-located dual band antennas, namely, dual band antennas 405av,ah and 405bv,bh, each provide approximately the same 180° field-of-view for the radiation pattern coverage as the other co-located antenna of the pair. When combined together the antennas can provide a 360° field-of-view for the coverage in at least one plane but more typically at least two planes.

In FIG. 4F the dual band antennas 405av,ah,bv,bh are each coupled to an impedance matching filter 413av,ah,bv,bh. The impedance matching filters 413av,ah,bv,bh are each coupled to a diplexer 415av,ah,bv,bh. Each diplexer 415av,ah,bv,bh is coupled to a high frequency band transceiver $411_{Hi}$ and a low frequency band transceiver $411_{Lo}$ through a splitter/combiner or switch $409_{Hi\,Lo}$. In the embodiment of the spatially diverse antenna system presented in FIG. 4F, the diplexers 415av,ah, bv,bh diplex the signals received from the dual band antennas so that the low band signals received are filtered and coupled to the low band transceiver and the high band signals received are filtered and coupled to the high band transceiver. For transmission, signals from both the high and low band transceivers are diplexed and coupled to the dual band antennas 405av,ah,bv,bh, through the impedance matching filters 413a,b. If FIG. 4F is implemented using switches $409_{Hi, Lo}$, rather than splitter/combiners 409, then the high and/or low transceiver reception/transmission can be switched on or off using the switches $409_{Hi, Lo}$.

FIGS. 5A-5D show printed circuit board layouts (PCBs) of an example embodiment of a spatially diverse antenna system a headset computer 100.

Figure 5A:
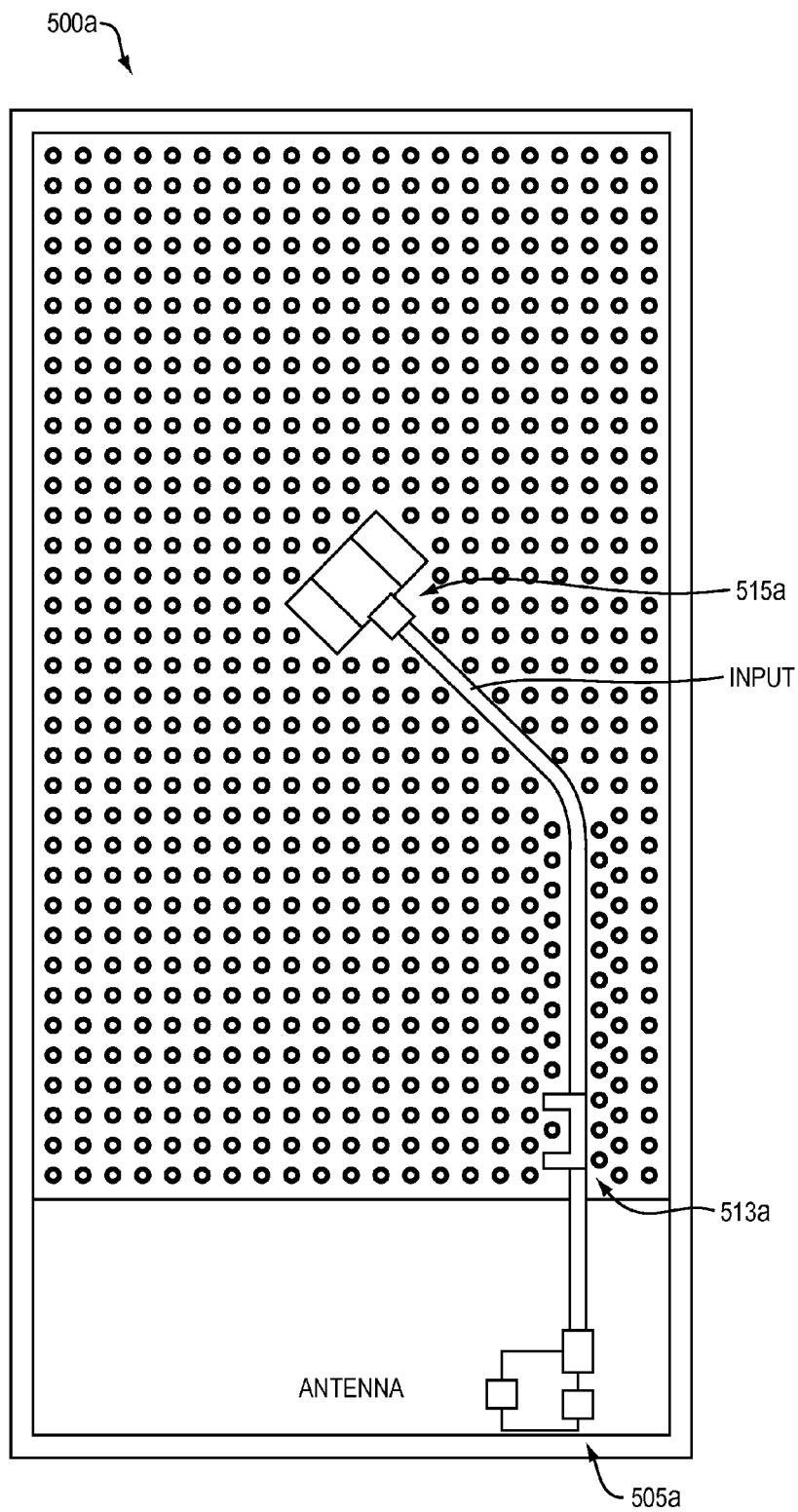
FIGS. 5A-5D are example embodiments of printed circuit boards comprising an example embodiment of the spatially diverse antenna system for a headset computing device.

FIG. 5A is an example embodiment of the first antenna printed circuit board (PCB) assembly 500a. The first antenna PCB assembly 500a includes a first antenna 505a, a tuning (or matching) circuit 513a and a transmission line transition 515a. The first antenna 505a, which is preferably an inverted F type antenna, is operatively coupled to tuning circuit 513a via microstrip transition line. The tuning circuit 513a is used to adjust the impedance between the first antenna 505a and the antenna feed network so that power can be efficiently radiated and received. Microstrip transmission line operatively couples tuning circuit 513a to transition 515a. The transmission line transition 515a is used to transition the transmission line from microstrip to coaxial cable so that the signals can be combined (or split for transmission) on a second antenna PCB assembly 500b (shown in FIG. 5B).

Figure 5B:
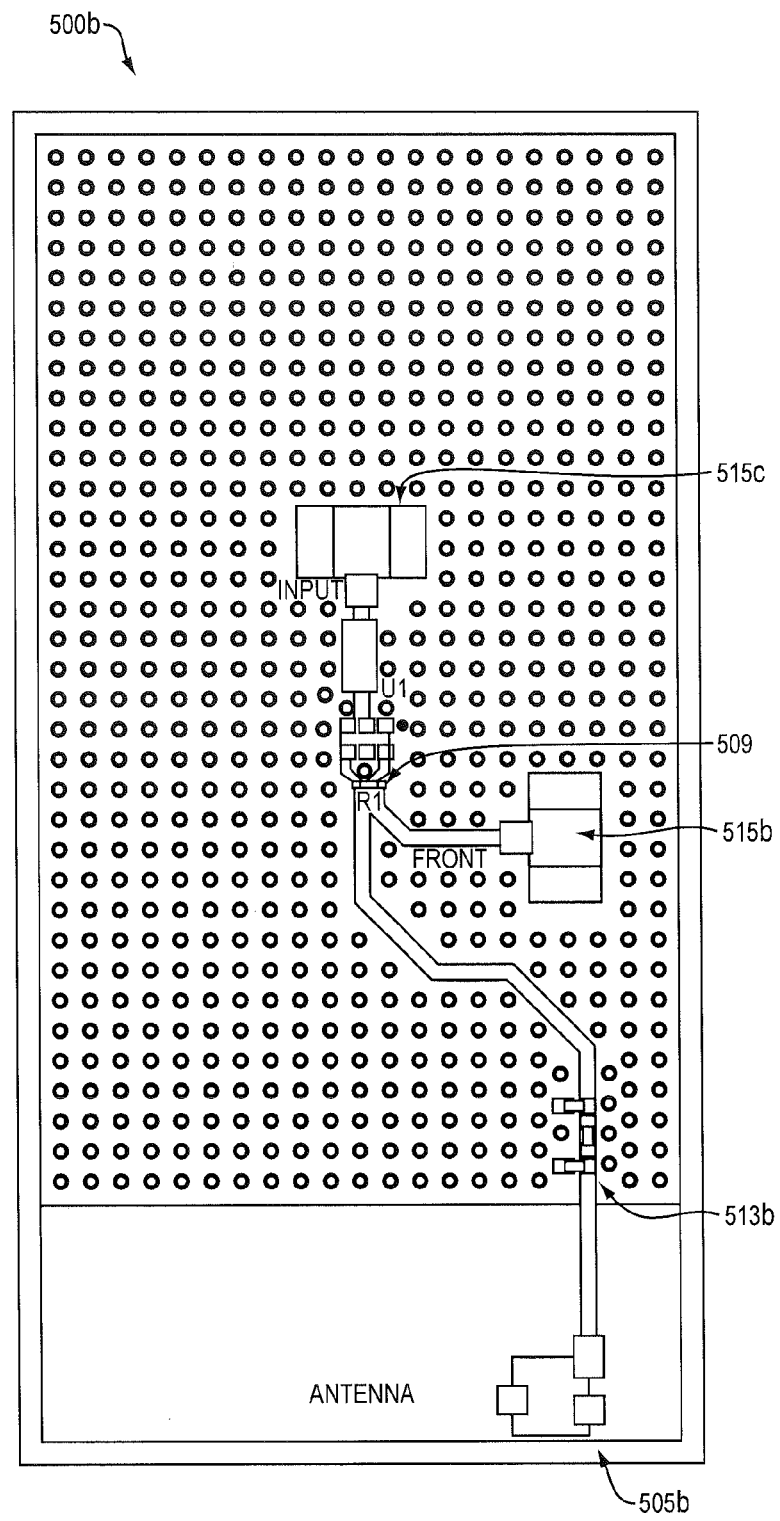

FIG. 5B is an example embodiment of a second antenna PCB assembly 500b. The second antenna PCB assembly 500b includes a second antenna 505b, a tuning or matching circuit 513b, a transmission line transition 515b,c and combiner/splitter circuit 509. The second antenna 505b, preferably an inverted F type antenna, is operatively coupled to tuning circuit 513b via microstrip transmission line. The tuning circuit 513b is used to adjust the impedance between the second antenna 505b and the antenna feed network so that power can be efficiently radiated and received. Microstrip operatively couples tuning circuit 513b to splitter/combiner circuit 509. The splitter/combiner circuit 509 is operatively coupled to a transmission line transition 515b. The transmission line transition 515b is used to transition the transmission line from coaxial cable, which is coupled to transmission line transition 515a via coaxial cable, to microstrip. The splitter/combiner circuit 509 is used to passively combine inputs from first and second antennas 505a,b. The output of splitter/combiner circuit 509 is coupled via microstrip to transmission line transition 515c in order to propagate the combined signal to the receiver via coaxial cable for reception.

Figure 5C:
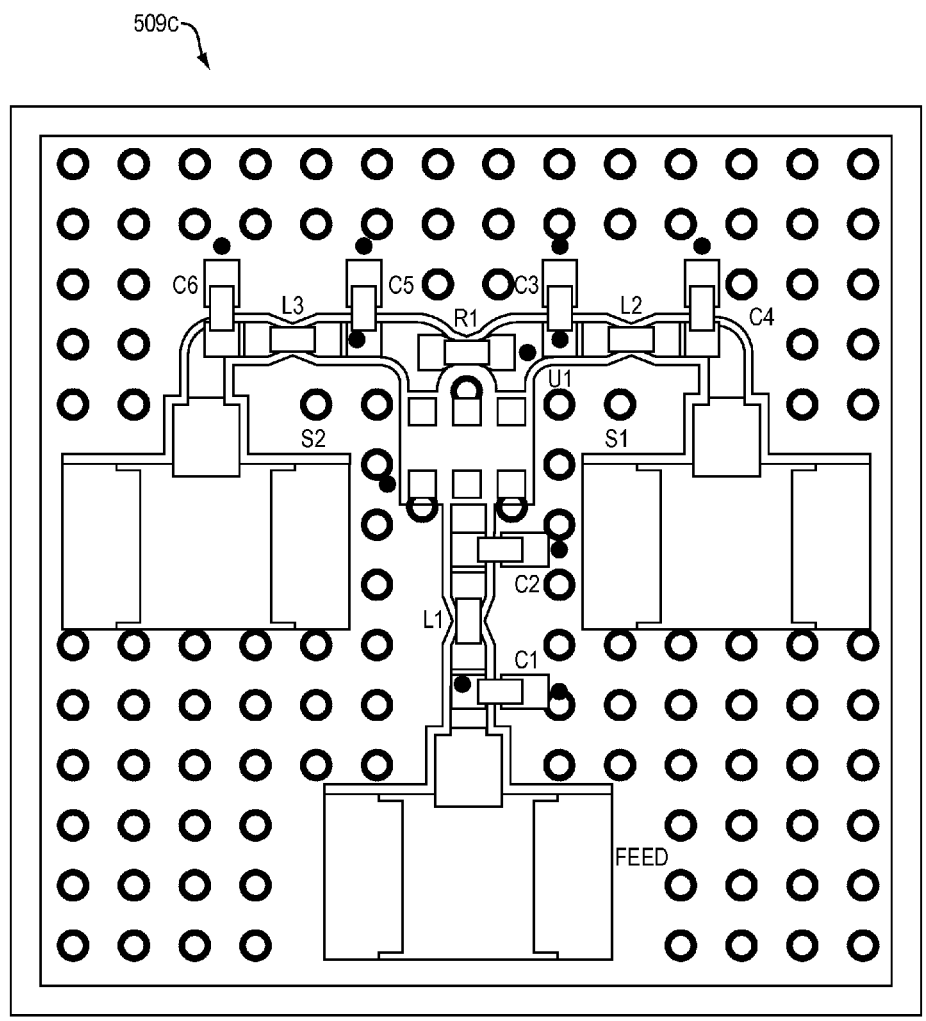
Figure 5D:
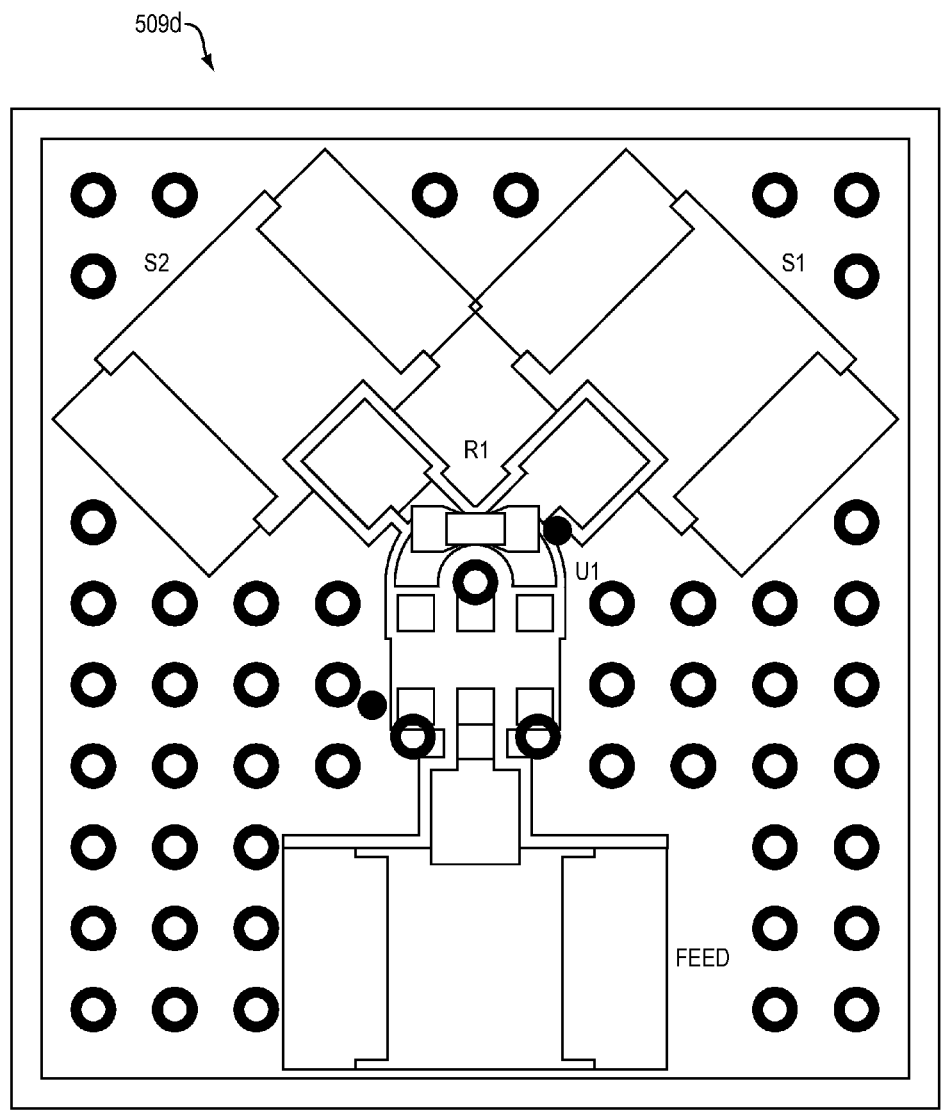

FIGS. 5C and 5D are example embodiments of 3 dB splitter/combiner PCB assemblies 509c,d. The 3 dB splitter/combiner 509c includes a matching network of LC circuits using microstrip so that the impedance of the ports is tuned. The splitter/combiner 509c combines signals at the feed port from the input ports S1 and S2. The 3 dB splitter/combiner 509c is a balanced reciprocal device; input from the feed port is split evenly between the ports S1 and S2 and vice versa.

In the 3 dB splitter/combiner circuit 509d of FIG. 5D, inputs into the ports S1 and S2 are combined and output at the feed port. The 3 dB splitter/combiner circuit 509d is a balanced reciprocal device, input at the feed port is split evenly between the ports S1 and S2 and vice versa.

FIGS. 6A-6F are example plots, diagrams and illustrations representing combined radiation patterns for an example embodiment of the spatially diverse antenna system for a headset computing device.

Figure 6A:
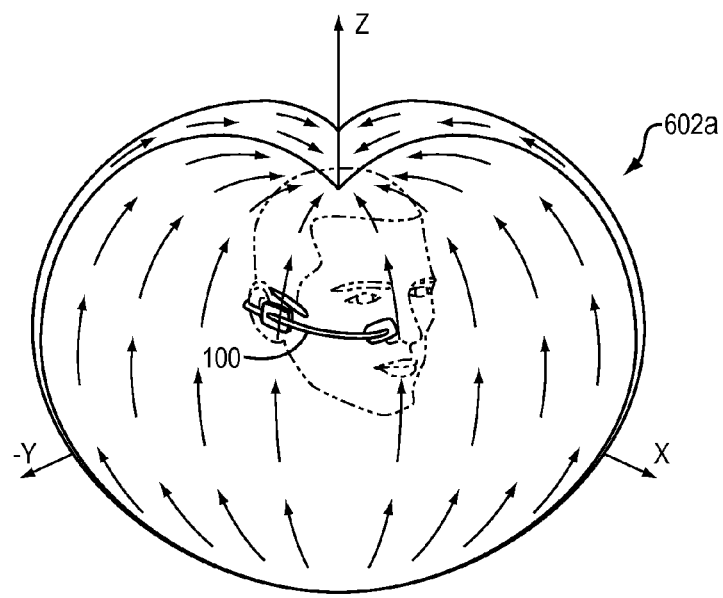
FIGS. 6A-6F are example plots, diagrams and representations of combined radiation patterns for an example embodiment of the spatially diverse antenna system for a headset computing device.

FIG. 6A is a 3D plot of the theta component 602 of the E-field (or the vertically polarized E-field 602) of the combined radiation pattern for a spatially diverse antenna system for a headset computing device 100 as worn by a user. The user's head creates a RF shadow region for each individual radiation pattern, blocking or significantly reducing gain. For the combined pattern, the user's head causes some blockage such that the gain is reduced along the YZ-axis.

Figure 6B:
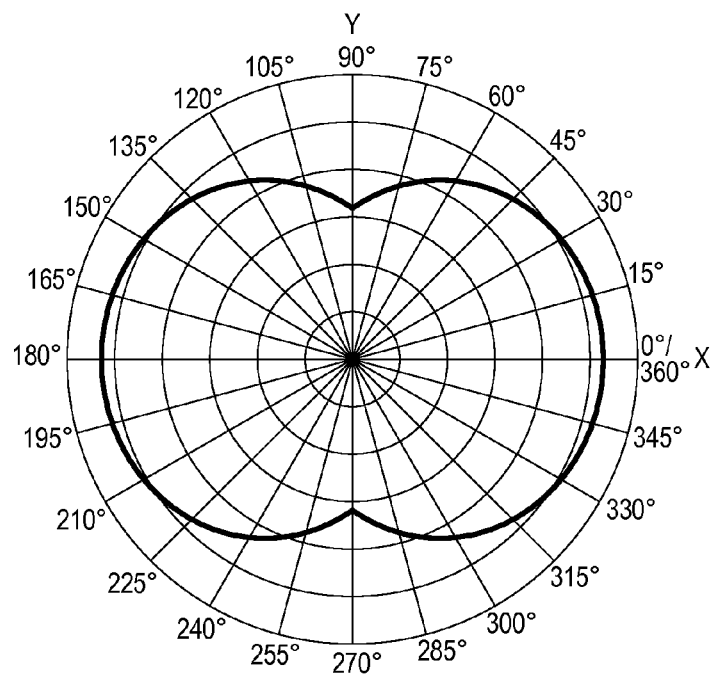
Figure 6C:
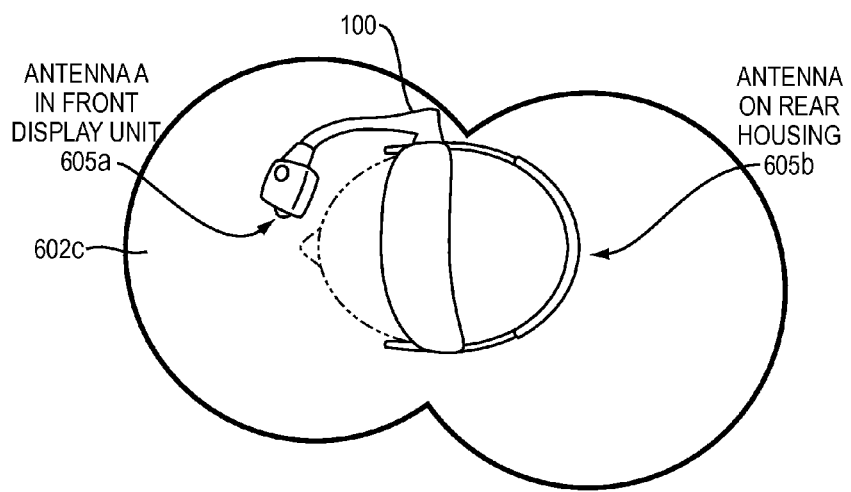
Figure 6D:
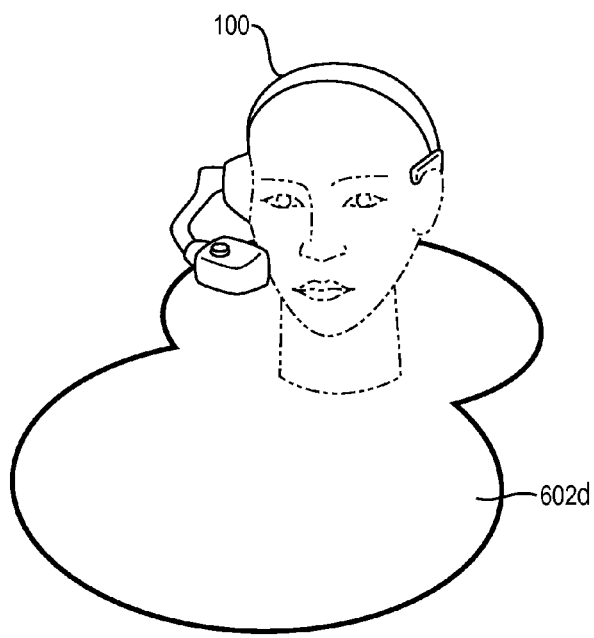
Figure 6E:
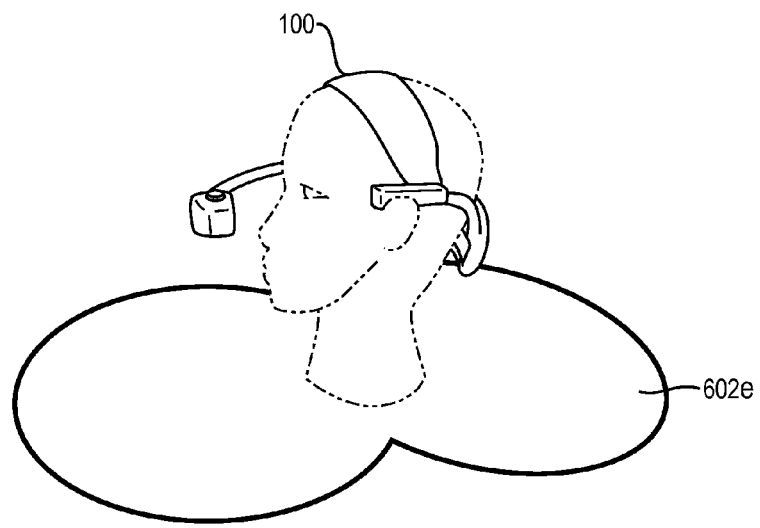
Figure 6F:
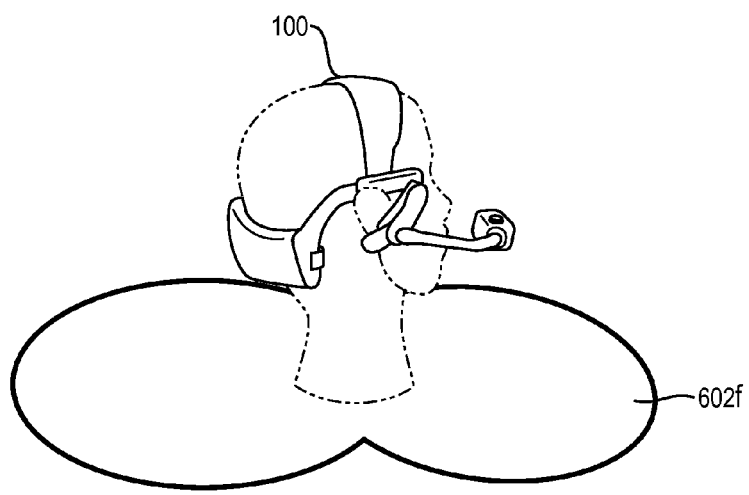

FIG. 6B is a polar plot in the E-field (the XY plane) of the combined radiation pattern approaching an omnidirectional pattern for an example embodiment of a spatially diverse antenna system for a headset computing device 100 as worn by a user. The maximum gain direction is along the x-axis at 0° and 180°, which coincides with the preferred arrangement of the first and second antennas being arranged in the front and back of the headset device 100. Similarly, the minimum gain direction is along the Y-axis at 90° and 270°, which coincides with the direction at which the user's head equally blocks each antenna pattern.

FIGS. 6C-6F further illustrate the combined vertically polarized radiation pattern approaching an omnidirectional pattern for a spatially diverse antenna system for a headset computing device 100 as worn by a user, including the effects of a human head. More particularly, FIGS. 6C-6F illustrate a headset computing device 100 with first antenna 605a arranged at the front of the headset device 100 at the microdisplay 1010 and with second antenna 605b arranged at the back of the headset device 100 on housing 1004. Radiation patterns 602C-F (E-fields) are scaled projections of the farfield patterns onto a horizontal plane intersecting a user's neck, for a user in a typical standing position. Radiation patterns 602C-F show the coverage provided by a first and second antennas 605a,b and the improvement compared to the possible coverage provided by a single antenna.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A headset computing device comprising:
a head worn frame having a profile relatively low in height with respect to a user's head, the user's head creating a radio frequency (RF) shadow region on the headset profile by blocking a line-of-sight RF propagation path; and
two or more co-located antenna pairs integrally arranged on the headset frame to sufficiently maintain the low profile, and each antenna pair having a radiation pattern and the two or more co-located antenna pairs collectively forming a combined radiation pattern approaching omnidirectional in two or more orthogonal planes, wherein at least a first antenna radiation pattern providing the line-of-sight RF propagation path while at least a second antenna radiation pattern being in the shadow region.

2. The headset computing device of claim 1, wherein the combined radiation pattern further includes dual linear polarization.

3. The headset computing device of claim 2, wherein the dual linear polarization includes vertical and horizontal polarizations.

4. The headset computing device of claim 1, wherein the first antenna and second antenna are integrally arranged with approximately 180 degrees of spatial diversity with respect to the user's head.

5. The headset computing device of claim 1, further comprising a splitter/combiner coupled to the two or more antennas for combining receive RF signals received by the antennas and splitting transmit RF signals transmitted by the antennas.

6. The headset computing device of claim 5, further comprising a transceiver operatively coupled to the splitter/combiner for receiving the combined receive RF signals and transmitting split transmit RF signals.

7. The headset computing device of claim 1, further comprising a switch coupled to the two or more antennas for switching between the antennas.

8. The headset computing device of claim 7, further comprising a transceiver operatively coupled to the switch for receiving the receive RF signals and transmitting the transmit RF signals from the at least one switched on antenna of the two or more antennas antenna.

9. The headset computing device of claim 1, wherein the at least two antennas are tuned to operate over multiple separate frequency bands.

10. The headset computing device of claim 9, wherein the multiple frequency bands include a first frequency band ranging roughly from 2.36 GHz to 2.54 GHz and a second frequency band ranging roughly from 4.84 GHz to 5.16 GHz.

11. The headset computing device of claim 9, wherein the at least two antennas are further coupled to a diplexer for diplexing the multiple separate frequency bands.

12. The headset computing device of claim 1, wherein the at least two antennas are dual band inverted F-type antennas.

13. A method of receiving radio frequency (RF) signals at a headset computing device, the method comprising:
wearing a head worn frame having a profile relatively low in height with respect to a user's head, the user's head blocking a line-of-sight RF propagation path creating a radio frequency (RF) shadow region on the headset profile; and
receiving RF signals at two or more co-located antenna pairs integrally arranged on the headset frame to sufficiently maintain the low profile, and each antenna pair having a radiation pattern and the two or more co-located antenna pairs collectively forming a substantially omnidirectional radiation pattern in two or more orthogonal planes, wherein at least a first antenna radiation pattern providing the line-of-sight RF propagation path while at least a second antenna radiation pattern being in the shadow region.

14. The method of receiving RF signals of claim 13, wherein the combined radiation pattern further includes dual linear polarization.

15. The method of receiving RF signals of claim 14, wherein the dual linear polarization includes vertical and horizontal polarizations.

16. The method of receiving RF signals of claim 13, wherein the first and second antennas are integrally arranged with approximately 180 degrees of spatial diversity with respect to the user's head.

17. The method of receiving RF signals of claim 13, further comprising combining receive RF signals received by the antennas at a splitter/combiner coupled to the two or more antennas.

18. The method of receiving RF signals of claim 17, further comprising receiving the receive RF signals at a transceiver operatively coupled to the splitter/combiner and transmitting transmit RF signals split at the splitter/combiner coupled to the two or more antennas.

19. The method of receiving RF signals of claim 13, further comprising switching between the at least two or more antennas.

20. The method of receiving RF signals of claim 19, further comprising a transceiver operatively coupled to the switch for receiving the receive RF signals at transmitting transmit RF signals from at least one of the two or more antennas.

21. The method of receiving RF signals of claim 13, wherein the at least two antennas are tuned to operate over multiple separate frequency bands for receiving the RF signals.

22. The method of receiving RF signals of claim 21, wherein the multiple frequency bands include a first frequency band ranging roughly from 2.36 GHz to 2.54 GHz and a second frequency band ranging roughly from 4.84 GHz to 5.16 GHz.

23. The method of receiving RF signals of claim 21, wherein the at least two antennas are coupled to a diplexer for diplexing the multiple separate frequency bands.

24. The method of receiving RF signals of claim 13, wherein the at least two antennas are dual band inverted F-type antennas.

* * * * *